United States Patent
Lanau et al.

(10) Patent No.: US 12,448,479 B2
(45) Date of Patent: Oct. 21, 2025

(54) RADIATION CURABLE AND PRINTABLE COMPOSITION

(71) Applicant: Henkel AG & Co. KGaA, Duesseldorf (DE)

(72) Inventors: Sebastien Lanau, Duesseldorf (DE); Andrea Gutacker, Langenfeld (DE); Johann Klein, Duesseldorf (DE); Claudia Meckel-Jonas, Duesseldorf (DE); Ralf Dunekake, Duesseldorf (DE); Markus Bonigut, Hilden (DE)

(73) Assignee: Henkel AG & Co. KGaA, Duesseldorf (DE)

(*) Notice: Subject to any disclaimer, the term of this patent is extended or adjusted under 35 U.S.C. 154(b) by 409 days.

(21) Appl. No.: 17/453,944

(22) Filed: Nov. 8, 2021

(65) Prior Publication Data
US 2022/0056195 A1    Feb. 24, 2022

Related U.S. Application Data

(63) Continuation of application No. PCT/EP2020/062831, filed on May 8, 2020.

(30) Foreign Application Priority Data

May 13, 2019 (EP) .................................... 19174106

(51) Int. Cl.
| | | |
|---|---|---|
| *C08G 18/67* | (2006.01) | |
| *B29C 64/118* | (2017.01) | |
| *B29K 71/00* | (2006.01) | |
| *B33Y 10/00* | (2015.01) | |
| *B33Y 70/00* | (2020.01) | |
| *C08G 18/24* | (2006.01) | |
| *C08G 18/48* | (2006.01) | |
| *C08G 18/75* | (2006.01) | |
| *C09D 11/101* | (2014.01) | |
| *C09D 175/14* | (2006.01) | |
| *C09D 175/16* | (2006.01) | |

(52) U.S. Cl.
CPC ............ *C08G 18/672* (2013.01); *B33Y 70/00* (2014.12); *C08G 18/242* (2013.01); *C08G 18/4845* (2013.01); *C08G 18/671* (2013.01); *C08G 18/755* (2013.01); *C09D 11/101* (2013.01); *C09D 175/14* (2013.01); *C09D 175/16* (2013.01); *B29C 64/118* (2017.08); *B29K 2071/12* (2013.01); *B33Y 10/00* (2014.12)

(58) Field of Classification Search
CPC .................................................. C09D 175/16
See application file for complete search history.

(56) References Cited

U.S. PATENT DOCUMENTS

| | | |
|---|---|---|
| 2003/0149127 A1 | 8/2003 | Jansen et al. |
| 2004/0181007 A1 | 9/2004 | Acevedo et al. |
| 2007/0213493 A1 | 9/2007 | Jacobine et al. |
| 2009/0131561 A1 | 5/2009 | Pfaadt et al. |
| 2016/0122473 A1 | 5/2016 | Monnier et al. |
| 2016/0128909 A1 | 5/2016 | Fontein et al. |
| 2016/0257827 A1 | 9/2016 | Takiguchi et al. |
| 2016/0324730 A1* | 11/2016 | Lee .................... A61C 13/0004 |
| 2017/0362480 A1 | 12/2017 | Lu et al. |

FOREIGN PATENT DOCUMENTS

| | | |
|---|---|---|
| CN | 108603089 A | 9/2018 |
| CN | 109608589 | 4/2019 |
| EP | 2676633 A1 | 12/2013 |
| JP | 2003055429 A | 2/2003 |
| WO | 2017112653 | 6/2017 |
| WO | 2018005350 | 1/2018 |

OTHER PUBLICATIONS

International Search Report issues in connection with International Application No. PCT/EP2020/062831 mailed Jul. 31, 2020.
Liravi Farzad et al., "A hybrid additive manufacturing method for the fabrication of silicone bio-structurs: 3D printing optimization and surface characterization", Materials and Design, vol. 138, pp. 46-61 (2017).

* cited by examiner

*Primary Examiner* — Wenwen Cai
(74) *Attorney, Agent, or Firm* — Mary K. Cameron

(57) ABSTRACT

The present invention relates to radiation of dual radiation/moisture curable compositions based on (meth)acrylate- and silane-terminated polymers that can be used as 3D printing materials and provide isotropic and elastomeric properties. The invention further relates to the use thereof as 3D printing materials and printing methods using said compositions.

17 Claims, No Drawings

RADIATION CURABLE AND PRINTABLE COMPOSITION

The present invention lies in the field of reactive curable compositions for 3D printing applications. In particular, the invention relates to radiation or radiation/moisture curable compositions based on (meth)acrylate- and silane-terminated polymers that can be used as pasty 3D printing materials and provide isotropic and elastomeric properties as well as their use as 3D printing materials and printing methods using said compositions.

In 3D printing applications, also referred herein as additive manufacturing, a wide variety of polymeric materials are used. However, to date there are no elastomeric printable compositions available.

While one-component, moisture-curing adhesives and sealants, in particular so-called silane-terminated adhesives and sealants, have for years played an important part in numerous technical applications, since compared with polyurethane adhesives and sealants, the silane-terminated adhesives and sealants have the advantage that they are free from isocyanate groups and provide for a broad range of adhesion to a wide variety of substrates without any surface pretreatment using primers, such polymer systems have so far not been described for 3D printing applications.

As silane-modified polymer compositions provide for a variety of interesting properties, such as being isotropic and chemically curable to provide elastomers, it would be highly advantageous to have silane-modified polymer compositions available that are useful as 3D printing materials. In addition, such compositions would provide for the advantage that they do not deform under elevated temperatures—in contrast to hotmelts—and can be combined with a variety of additives to tune the properties of the obtained product, such as mechanical properties, fire resistance, thermal conductivity, electrical conductivity, heat resistance, UV resistance, weather resistance, etc.

For being useful in 3D printing applications, these compositions have to be printable with suitable printing apparatuses, for example by extrusion processes, while at the same time providing sufficient stability to keep the desired form before and during the curing reaction.

The present invention solves this need by providing a reactive curable printing composition that is radiation curable and, optionally, also moisture curable and provided in form of a 3D printing paste composition with isotropic and elastomeric properties that is printable and sufficiently stable to be used in additive manufacturing of 3D objects.

In a first aspect, the present invention relates to a reactive curable printable composition, comprising
a) at least one first polymer A comprising at least one terminal group of the general formula (I)

$$-A^1-C(=O)-CR^1=CH_2 \qquad (1),$$

wherein
$A^1$ is a divalent bonding group containing at least one heteroatom; and
$R^1$ is selected from H and $C_1$-$C_4$ alkyl, preferably H and methyl;
and, optionally,
at least one terminal group of the general formula (II)

$$-A^2-SiXYZ \qquad (II),$$

wherein X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups; and
$A^2$ is a divalent bonding group containing at least one heteroatom;
wherein the polymer backbone of the at least one polymer A is selected from the group consisting of polyoxyalkylenes, poly(meth)acrylates, polyesters, and combinations thereof;
and, optionally,
b) at least one second polymer B comprising at least one terminal group of the general formula (II)

$$-A^2-SiXYZ \qquad (II),$$

wherein X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups;
$A^2$ is a divalent bonding group containing at least one heteroatom; and
wherein the polymer backbone of the at least one polymer B is optionally selected from the group consisting of polyoxyalkylenes, poly(meth)acrylates, polyesters, and combinations thereof;
wherein said first polymer A comprises at least one terminal group of formula (II) and/or said composition comprises a second polymer B.

In another aspect, the invention relates to a method for manufacturing a three-dimensional part by 3D printing, the method comprising:
a) printing a reactive curable printable composition as described herein in a layer-by-layer manner to form the three-dimensional part;
b) curing the printed layers of the reactive curable printable composition to obtain the three-dimensional part.

In still another aspect, the invention is directed to the use of a reactive curable printable composition as described herein as a 3D printing material.

A "composition" is understood in the context of the present invention as a mixture of at least two ingredients.

The term "curable" is to be understood to mean that, under the influence of external conditions, in particular under the influence of radiation and moisture present in the environment and/or supplied for the purpose, the composition can pass from a relatively flexible state, optionally possessing plastic ductility, to a harder state. In general, the crosslinking can take place by means of chemical and/or physical influences, for example, by the supply of energy in the form of heat, light or other electromagnetic radiation, but also by simply bringing the composition into contact with air, atmospheric moisture, water, or a reactive component. In the context of the present invention, "curable" predominantly relates to the property of the terminal groups of formula (I) to crosslink and of the terminal groups of formula (II) to condensate. "Radiation curable", as used herein, thus relates to curing under the influence, e.g. exposure, to radiation, such as electromagnetic radiation, in particular UV radiation or visible light. UV radiation is in the range of 100 to 400 nanometers (nm). Visible light is in the range of 400 to 780 nanometers (nm). "Moisture-curable", as used herein, thus relates to curing under the influence of moisture, typically humidity from the surrounding air.

Provided reference is made to molecular weights of oligomers or polymers in the present application, the quantities, unless otherwise stated, refer to the number average, i.e., the $M_n$ value, and not to the weight average molecular weight.

"At least one," as used herein, refers to 1 or more, i.e., 1, 2, 3, 4, 5, 6, 7, 8, 9, or more. In regard to an ingredient, the term relates to the type of ingredient and not to the absolute number of molecules. "At least one polymer" thus means, for example, at least one type of polymer, i.e., that a type of polymer or a mixture of a number of different polymers can be used. Together with weight data, the term refers to all compounds of the given type, contained in a composition/mixture, i.e., that the composition contains no other compounds of this type beyond the given amount of the relevant compounds.

All percentage data, provided in connection with the compositions described herein, refer to % by weight, based in each case on the relevant mixture, unless explicitly indicated otherwise.

"Consisting essentially of", as used herein, means that the respective composition is composed mainly, i.e. by at least 50% by weight, for example at least 60, 70 or 80%, of the referenced component(s), as described below.

"Alkyl," as used herein, refers to a saturated aliphatic hydrocarbon including straight-chain and branched-chain groups. The alkyl group preferably has 1 to 10 carbon atoms (if a numerical range, e.g., "1-10" is given herein, this means that this group, in this case the alkyl group, can have 1 carbon atom, 2 carbon atoms, 3 carbon atoms, etc., up to and including 10 carbon atoms). In particular, the alkyl can be an intermediate alkyl, which has 5 to 6 carbon atoms, or a lower alkyl, which has 1 to 4 carbon atoms, e.g., methyl, ethyl, n-propyl, isopropyl, butyl, isobutyl, tert-butyl, etc. The alkyl groups can be substituted or unsubstituted. "Substituted," as used in this connection, means that one or more carbon atoms and/or hydrogen atom(s) of the alkyl group are replaced by heteroatoms or functional groups. Functional groups that can replace the hydrogen atoms are selected particularly from =O, =S, —O—($C_{1-10}$ alkyl), —O—($C_{6-14}$ aryl), —N($C_{1-10}$ alkyl)$_2$, such as —N(CH$_3$)$_2$, —F, —Cl, —Br, —I, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms are independently nitrogen, oxygen, or sulfur. Substituted alkyl includes, for example, alkylaryl groups. Heteroalkyl groups in which 1 or more carbon atoms are replaced by heteroatoms, particularly selected from O, S, N, and Si, are obtained by the replacement of one or more carbon atoms by heteroatoms. Examples of such heteroalkyl groups are, without limitation, methoxymethyl, ethoxyethyl, propoxypropyl, methoxyethyl, isopentoxypropyl, trimethoxypropylsilyl, etc. In various embodiments, substituted alkyl includes $C_{1-10}$ alkyl, preferably $C_{1-4}$ alkyl, such as propyl, substituted with aryl, alkoxy or oxyaryl. "Alkylene", as used herein, relates to the corresponding divalent alkyl group, i.e. alkanediyl.

"Alkenyl," as used herein, refers to an alkyl group, as defined herein, which consists of at least two carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl groups can be substituted or unsubstituted. If they are substituted, the substituents are as defined above for alkyl. "Alkenyloxy" refers to an alkenyl group, as defined herein, that is linked via an —O— to the rest of the molecule. The respective term thus includes enoxy groups, such as vinyloxy (H$_2$C=CH—O—). "Alkenylene", as used herein, relates to the corresponding divalent alkenyl group.

"Alkynyl," as used herein, refers to an alkyl group, as defined herein, which consists of at least two carbon atoms and at least one carbon-carbon triple bond, e.g., ethynyl (acetylene), propynyl, butynyl, or petynyl and structural isomers thereof as described above. Alkynyl groups can be substituted or unsubstituted. If they are substituted, the substituents are as defined above for alkyl. "Alkylnyloxy" refers to an alkynyl group, as defined herein, that is linked via an —O— to the rest of the molecule. "Alkynylene", as used herein, relates to the corresponding divalent alkynyl group.

A "cycloaliphatic group" or "cycloalkyl group," as used herein, refers to monocyclic or polycyclic groups (a number of rings with carbon atoms in common), particularly of 3-8 carbon atoms, in which the ring does not have a completely conjugated pi-electron system, e.g., cyclopropyl, cyclobutyl, cyclopentyl, cyclohexyl, cyclobutenyl, cyclopentenyl, cyclohexenyl, etc. Cycloalkyl groups can be substituted or unsubstituted. "Substituted," as used in this regard, means that one or more hydrogen atoms of the cycloalkyl group are replaced by functional groups. Functional groups that can replace the hydrogen atoms are selected particularly from =O, =S, —O—($C_{1-10}$ alkyl), —O—($C_{6-14}$ aryl), —N($C_{1-10}$ alkyl)$_2$, such as —N(CH$_3$)$_2$, —F, —Cl, —Br, —I, —COOH, —CONH$_2$, —$C_{1-10}$ alkyl or alkoxy, $C_{2-10}$ alkenyl, $C_{2-10}$ alkynyl, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms independently are nitrogen, oxygen, or sulfur. "Cycloalkyloxy" refers to a cycloalkyl group, as defined herein, that is linked via an —O— to the rest of the molecule. "Cycloalkylene", as used herein, relates to the corresponding divalent cycloalkyl group.

"Aryl," as used herein, refers to monocyclic or polycyclic groups (i.e., rings that have neighboring carbon atoms in common), particularly of 6 to 14 carbon ring atoms which have a completely conjugated pi-electron system. Examples of aryl groups are phenyl, naphthalenyl, and anthracenyl. Aryl groups can be substituted or unsubstituted. If they are substituted, the substituents are as defined above for cycloalkyl. "Aryloxy" refers to an aryl group, as defined herein, that is linked via an —O— to the rest of the molecule. "Arylene", as used herein, relates to the corresponding divalent aryl group.

A "heteroaryl" group, as used herein, refers to a monocyclic or polycyclic (i.e., rings that share an adjacent ring atom pair) aromatic ring, having particularly 5 to 10 ring atoms, where one, two, three, or four ring atoms are nitrogen, oxygen, or sulfur and the rest is carbon. Examples of heteroaryl groups are pyridyl, pyrrolyl, furyl, thienyl, imidazolyl, oxazolyl, isoxazolyl, thiazolyl, isothiazolyl, pyrazolyl, 1,2,3-triazolyl, 1,2,4-triazolyl, 1,2,3-oxadiazolyl, 1,2,4-oxadiazolyl, 1,2,5-oxadiazolyl, 1,3,4-oxadiazolyl, 1,3,4-triazinyl, 1,2,3-triazinyl, benzofuryl, isobenzofuryl, benzothienyl, benzotriazolyl, isobenzothienyl, indolyl, isoindolyl, 3H-indolyl, benzimidazolyl, benzothiazolyl, benzoxazolyl, quinolizinyl, quinazolinyl, phthalazinyl, quinoxalinyl, cinnolinyl, naphthyridinyl, quinolyl, isoquinolyl, tetrazolyl, 5,6,7,8-tetrahydroquinolyl, 5,6,7,8-tetrahydroisoquinolyl, purinyl, pteridinyl, pyridinyl, pyrimidinyl, carbazolyl, xanthenyl, or benzoquinolyl. Heteroaryl groups can be substituted or unsubstituted. If they are substituted, the substituents are as defined above for cycloalkyl. "(Hetero) aryl", as used herein, refers to both aryl and heteroaryl groups as defined herein. "Heteroaryloxy" refers to a heteroaryl group, as defined herein, that is linked via an —O— to the rest of the molecule.

A "heteroalicyclic group" or a "heterocycloalkyl group," as used herein, refers to a monocyclic or fused ring having 5 to 10 ring atoms, which contains one, two, or three heteroatoms, selected from N, O, and S, whereby the rest of the ring atoms are carbon. A "heterocycloalkenyl" group contains in addition one or more double bonds. The ring however has no completely conjugated pi-electron system. Examples of heteroalicyclic groups are pyrrolidinone, piperidine, piperazine, morpholine, imidazolidine, tetrahydropyridazine, tetrahydrofuran, thiomorpholine, tetrahydropyridine, and the like. Heterocycloalkyl groups can be substituted or unsubstituted. If they are substituted, the substituents are as defined above for cycloalkyl. "Heteroalicyclic" refers to a heteroalicyclic group, as defined herein, that is linked via an —O— to the rest of the molecule.

"Substituted" in relation to hydrocarbon moieties, as used herein, has the meaning provided above depending on the type of the hydrocarbon moiety. Accordingly, the hydrocarbon moiety may be an alkyl, alkenyl, alkynyl, cycloaliphatic or aryl group, as defined above, or the bivalent or polyvalent variants thereof, that may be substituted or unsubstituted, as defined above.

The polymer having the at least one terminal group of the general formula (I) and or (II), i.e. the at least one first polymer A and/or the at least one second polymer B, is preferably a polyoxyalkylene/polyether, polyester, or a poly (meth)acrylate, such as a poly(meth)acrylic acid (ester).

A "polyoxyalkylene", "polyalkylene glycol" or "polyether", as used interchangeably herein, is understood to be a polymer in which the organic repeating units comprise ether functionalities C—O—C in the main chain. Polymers having lateral ether groups, such as cellulose ethers, starch ethers and vinyl ether polymers, as well as polyacetals such as polyoxymethylene (POM) are not included in the polyethers. Examples for such polymers are polypropylene and polyethylene and copolymers thereof.

In various embodiments, the polymer has a polyoxyethylene backbone, polypropylene backbone, or polyoxyethylene-polyoxypropylene backbone, preferably a polyoxypropylene backbone.

A "poly(meth)acrylic acid (ester)" is understood to be a polymer based on (meth)acrylic acid (esters), which therefore has as a repeating unit the structural motif —$CH_2$—$CR^a(COOR^b)$—, where $R^a$ denotes a hydrogen atom (acrylic acid ester) or a methyl group (methacrylic acid ester) and $R^b$ denotes hydrogen or linear alkyl residues, branched alkyl residues, cyclic alkyl residues and/or alkyl residues comprising functional substituents, for example methyl, ethyl, isopropyl, cyclohexyl, 2-ethylhexyl or 2-hydroxyethyl residues.

The polymer having at least one terminal group of the general formula (I) and/or (II) is particularly preferably a polyether. Polyethers have a flexible and elastic structure, with which compositions having excellent elastic properties can be produced. Polyethers are not only flexible in their backbone, but at the same time strong. Thus, for example, polyethers are not attacked or decomposed by water and bacteria, in contrast to, e.g., polyesters, for example.

The number average molecular weight $M_n$ of the polyether on which the polymer is based is preferably at least 500 g/mol, such as 500 to 100000 g/mol (daltons), particularly preferably at least 700 g/mol and in particular at least 1000 g/mol. For example, the number average molecular weight $M_n$ of the polyether is 500 to 5000, preferably 700 to 40000, particularly preferably 1000 to 30000 g/mol. These molecular weights are particularly advantageous, since the corresponding compositions have a balanced ratio of viscosity (ease of processing), strength and elasticity. It is further preferable that the polyethers have a molecular weight $M_n$ of at least 500 g/mol, as lower molecular weights lead to high concentrations of urethane bonds and thus undesired hydrogen bonding, which can cause the formulation to be in a solid state, which is undesirable.

Particularly advantageous viscoelastic properties can be achieved if polyethers having a narrow molecular weight distribution, and thus low polydispersity, are used. These can be produced, for example, by so-called double metal cyanide catalysis (DMC catalysis). Polyethers produced in this way are distinguished by a particularly narrow molecular weight distribution, by a high average molecular weight and by a very low number of double bonds at the ends of the polymer chains.

In a special embodiment of the present invention, the maximum polydispersity $M_w/M_n$ of the polyether on which the polymer is based is therefore 3, particularly preferably 1.7 and most particularly preferably 1.5.

The number average molecular weight $M_n$, as well as the weight average molecular weight $M_w$, is determined according to the present invention by gel permeation chromatography (GPC, also known as SEC) at 23° C. using a styrene standard. The molecular weight can be determined by gel permeation chromatography (GPC) with tetrahydrofuran (THF) as the eluent according to DIN 55672-1:2007-08, preferably at 23° C. or 35° C. Molecular weights of monomeric compounds are calculated based on the respective molecular formula and the known molecular weights of the individual atoms. These methods are known to one skilled in the art. The polydispersity is derived from the average molecular weights $M_w$ and $M_n$. It is calculated as PD=$M_w/M_n$.

The ratio $M_w/M_n$ (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity. In particular, therefore, in the context of the present invention, the polyether on which the polymer A is based has a polydispersity ($M_w/M_n$) of less than 1.3.

Polyesters are typically polymers obtained by reaction of polycarboxylic acids with polyols, such as succinic acid or adipic acid with butane diol or hexane diol. For the polyesters, the same definitions as to preferred molecular weights and polydispersity given above for the polyethers apply.

In various embodiments, the polyether/polyester polymer having at least one terminal group of the general formula (I) and, optionally, (II), can be derived from a polyol or a mixture of two or more polyols, typically polyether polyols or polyester polyols.

A "polyol" is understood to be a compound which contains at least two OH groups, irrespective of whether the compound contains other functional groups. However, a polyol used in accordance with the present invention for the preparation of the inventive polymers preferably contains only OH groups as functional groups or, if other functional groups are present, none of these other functional groups are reactive at least to isocyanates under the conditions prevailing during the reactions of the polyol(s) and polyisocyanate(s) described herein.

The polyols suitable according to the invention are preferably polyether polyols. The above descriptions about the molecular weight and polydispersity of the polyether apply to the polyether polyols. The polyether polyol is preferably a polyalkylene oxide, particularly preferably polyethylene oxide and/or polypropylene oxide. In preferred embodiments, a polyether or a mixture of two polyethers are used.

The polyols to be used in accordance with the invention have an OH value of preferably about 5 to about 15 and, more preferably, of about 10. The percentage content of primary OH groups should be below about 20%, based on all the OH groups, and is preferably below 15%. In one particularly advantageous embodiment, the acid value of the polyethers used is below about 0.1, preferably below 0.05 and, more preferably, below 0.02.

Besides the polyethers, the polyol mixture may contain other polyols. For example, it may contain polyester polyols with a molecular weight of at least about 500 to about 50,000.

Generally, while all the polymers described above can have multiple reactive termini that are used for the attachment of the terminal groups described herein, such as multiple hydroxyl groups, thus being polyols, it may be preferable that they comprise two or three such reactive terminal groups for attachment of the terminal groups of formulae (I) and (II), preferably only two, thus being linear polymers. Particularly preferred are di-functional and tri-functional polymers, such as diols and/or triols, more preferred are di-functional polymers, such as diols, optionally in combination with tri-functional polymers, such as triols. If tri-functional polymers, such as triols, are used, these are preferably used in combination with di-functional polymers, such as diols, for example in a 1:1 molar ratio, more preferably in a 1:>1 molar ratio. Accordingly, in some embodiments, the polymers used are diols or diol/triol combinations with the given ratios.

It is generally preferred that if the polymers described herein, in particular the polyethers, include polyfunctional polymers, i.e. polymers having more than two reactive terminal groups, then these are present only in combination with polymers having a maximum of two reactive terminal groups. In such mixtures of polymers, the amount of difunctional polymers is preferably at least 50 mol-%, while the amount of tri- or higher functional polymers is preferably less than 50 mol-%, more preferably less than 45 mol-% or less than 40 mol-% or less than 35 mol-% or less than 30 mol-% or less than 25 mol-% or even less than 20 mol-%. Higher amounts of polyfunctional polymers may lead to an undesired degree of crosslinking already at the stage of generating the polymers of the invention.

The reactive curable polymer A of the invention comprises at least one terminal group of the general formula (I)

wherein
$A^1$ is a divalent bonding group containing at least one heteroatom; and
$R^1$ is selected from H and $C_1$-$C_4$ alkyl, preferably H and methyl;

wherein the polymer backbone is selected from the group consisting of polyoxyalkylenes, poly(meth)acrylates, polyesters, and combinations thereof.

The presence of the terminal acrylic groups imparts the polymer with radiation curing properties, such that the reactive curable polymer is in fact a radiation curable polymer. Herein, the at least one polymer A is also referred to as "radiation curable polymer". To obtain dual curing properties, the radiation curable polymer can further comprise at least one terminal group of the general formula (II)

wherein X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups; and
$A^2$ is a divalent bonding group containing at least one heteroatom.

In various embodiments, the radiation curable polymer may comprise at least two, for example 2 or 3 or 4 or more terminal groups of the general formula (I). In addition to these, the polymer may further comprise at least one terminal group of formula (II), for example 1, 2 or more. In various embodiments, the polymer may comprise at least one terminal group of formula (I), for example 1, 2 or 3, and at least one terminal group of formula (II), for example 1, 2 or 3. In some embodiments, the polymer is a linear polymer and thus comprises only two terminal groups. These may be of formula (I) or formula (I) and formula (II).

In various embodiments, the radiation curable polymer of the invention comprises 1 to 100 mol-%, preferably 50 to 100 mol-%, of terminal groups of formula (I) and 99 to 0 mol-%, preferably 50 to 0 mol-%, of terminal groups of formula (II). In a linear polymer having one terminal group of formula (I) and one terminal group of formula (II), the mol-% of both groups would thus be 50%. In various embodiments, it may be advantageous that both types of terminal groups are present, as this imparts dual curing properties to the polymer. This is advantageous, as the radiation curing provides a fast curing mechanism important for stability of the printed object directly after printing and the moisture curing provides for a slower curing mechanism that provides the object with the final properties, such as hardness and elasticity. While it is possible to indicate the number of terminal groups of each formula for a single polymer molecule, it is understood that, depending on the process of manufacture, the obtained population of polymers may vary in their structure with regard to the terminal groups, as it may be possible that such a process generates polymer molecules that have only terminal groups of formula (I), polymer molecules that have only terminal groups of formula (II) and polymer molecules that have both types of terminal groups. In such polymer compositions, the above given percentages regarding the percentage of the respective terminal groups still apply but then relate to the total number of terminal groups in the given population of polymer molecules.

In various embodiments, the molar ratio of terminal groups of formula (I) and (II) in the polymers of the invention is >1:1, for example at least 1.5:1, at least 2:1, at least 2.1:1, at least 2.2:1, or at least 2.4:1. The molar ratio may, in certain embodiments, be not higher than 20:1 or not higher than 15:1 or not higher than 10:1.

Accordingly, in various embodiments, the radiation curable polymer comprises (i) two or three, preferably two, terminal groups of formula (I) or (ii) one terminal group of formula (I) and one or two, preferably one, terminal group of formula (II), or (iii) two terminal groups of formula (I) and one terminal group of formula (II). Preferably, the polymer is a linear polymer.

In various embodiments, the at least one polymer A comprising at least one terminal group of formula (I) may be combined with a second polymer, this at least one second polymer B comprising at least one terminal group of formula (II). The polymer backbone of this at least one polymer B may also be selected from the group consisting of polyoxyalkylenes, poly(meth)acrylates, polyesters, and combinations thereof, but this is independent from the backbone of the polymer A. However, in various embodiments if two different polymers A and B are used in the composition, the backbones may be the same type of polymer backbone. In various embodiments, both polymers have polyether backbones. In other, alternative embodiments, the at least one polymer B has a backbone different from those listed above, such as a polysiloxane backbone, for example a polydimethylsiloxane (PDMS) backbone.

In various embodiments, where polymer B is present, the above given molar ratios of the terminal groups may still apply and may relate to the total number of terminal groups of formula (I) to total number of terminal groups of formula (II) in all polymers present.

While in the above embodiments, it is possible that the at least one polymer A only comprises terminal groups of formula (I) so that the presence of the at least one polymer B is mandatory, the at least one polymer B may also be additionally present in the composition in case the at least one polymer A comprises both types of terminal groups, i.e. groups of formulae (I) and (II).

In the following, all definitions of the linking and terminal groups apply to polymers A and B, insofar applicable.

In various embodiments, the divalent linking group $A^1$ and/or $A^2$ comprises a substituted or unsubstituted ether, amide, carbamate, urethane, urea, imino, siloxane, carboxylate, carbamoyl, amidino, carbonate, sulfonate or sulfinate group, preferably a urea and/or urethane group. "Substituted" in relation to these groups means that a hydrogen atom present in these groups may be replaced by a non-hydrogen moiety, such as alkyl, for example $C_{1-4}$ alkyl. While $A^1$ and/or $A^2$ may be any one of the listed groups, in various embodiments, they comprise further structural elements, such as further linking groups that link the listed functional group to the polymer and/or the terminal group.

Generally, in various embodiments, the linking groups $A^1$ and $A^2$ are generated in a capping reaction in which the polymer termini are reacted with a compound results in the terminal groups of formulae (I) and (II). In various embodiments, the polymers are provided in a hydroxyl (OH) terminated form and thus provide reactive groups on their termini that can be used for the capping reaction. In various embodiments, the terminal groups of the polymer backbone, such as hydroxyl groups, may be first functionalized with a polyisocyanate, such as a diisocyanate or triisocyanate, such as those described below, such that an NCO-terminated polymer is generated. This may then in the next step be reacted with an (meth)acrylate/silane that comprises an NCO-reactive group, such as an amino or hydroxyl group, preferably an hydroxy-modified (meth)acrylate and/or an aminosilane. The urethane and urea groups resulting from such a reaction, advantageously increase the strength of the polymer chains and of the overall crosslinked polymer.

"Polyisocyanate", as used herein, is understood to be a compound which has at least two isocyanate groups —NCO. This compound does not have to be a polymer, and instead is frequently a low molecular compound.

The polyisocyanates suitable according to the invention include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI ($H_{12}$-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other polyisocyanates suitable for use in accordance with the invention are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

Accordingly, in some embodiments, $A^1$ is a group of formula (III)

$$-R^{11}-A^{11}-(R^{12}-A^{12})_n-R^{13}- \quad (III)$$

wherein $R^{11}$, $R^{12}$, and $R^{13}$ are independently a bond or a divalent substituted or unsubstituted hydrocarbon residue with 1 to 20 carbon atoms, preferably a substituted or unsubstituted (cyclo)alkylene or arylene residue with 1 to 14 carbon atoms;

$A^{11}$ and $A^{12}$ are each independently a divalent group selected from —O—C(=O)—NH—, —NH—C(=O)O—, —NH—C(=O)—NH—, —NR"—C(=O)—NH—, —NH—C(=O)—NR"—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR"—, wherein R" can be hydrogen or a hydrocarbon moiety with 1 to 12 carbon atoms, optionally substituted, preferably $C_1$-$C_2$ alkyl or hydrogen; and n is 0 or 1.

"(Cyclo)alkylene", as used herein, means a cycloalkylene or alkylene group.

Being a "bond" means that the respective moiety is essentially absent, i.e. that the remaining structural elements are directly linked to the next structural element. For example, $R^{11}$ being a bond means that the structural element $A^{11}$ is directly bound to the polymer backbone, while $R^{13}$ being a bond and n being 0 means that $A^{11}$ is directly bound to the remaining part of the terminal group of formula (I), i.e. —C(=O)—$CR^1$=$CH_2$.

"Substituted" in relation to the (cyclo)alkylene or arylene groups has the same meaning as disclosed above in relation to alkyl, cycloalkyl and aryl groups. In some embodiments, in particular if $R^{13}$ is concerned, it also encompasses that the substituent is or comprises another group of the formula —C(=O)—$CR^1$=$CH_2$. It is however preferred that each group of formula (I) does contain only 1 or 2 groups of the structure —C(=O)—$CR^1$=$CH_2$, preferably only 1. In some embodiments, in particular if $R^{12}$ is concerned, it also encompasses that the substituent is or comprises another group of the formula -$A^{12}$-$R^{13}$— with this $R^{13}$ also being linked to a group of formula (I). These structures may, for example, be generated if a triisocyanate is used.

If n=0, this means that $A^{12}$ and $R^{12}$ are absent and $A^{11}$ is directly linked to $R^{13}$.

In any case, the orientation of the structural element of formula (III) is such that $R^{13}$ links to the structural element —C(=O)—$CR^1$=$CH_2$ of the group of formula (I), or if not present, $A^{12}$ or $A^{11}$.

In various embodiments, $R^{11}$ is a bond or a divalent substituted or unsubstituted hydrocarbon residue with 1 to 20 carbon atoms, preferably an unsubstituted alkylene residue with 1 to 4 carbon atoms, for example methylene, 1,2-ethylene, 1,3-propylene or 1,4-butylene;

$A^{11}$ is a divalent group selected from —O—C(=O)—NH—, —NH—C(=O)—NH—, and —NR"—C(=O)—NH—, preferably —O—C(=O)—NH—;

$R^{13}$ is a bond or a divalent substituted or unsubstituted hydrocarbon residue with 1 to 20 carbon atoms, preferably a substituted or unsubstituted alkylene residue with 1 to 8 carbon atoms, such as ethylene (—$CH_2$—$CH_2$—), propylene or butylene;

n is 0 or 1.

If, in the above embodiments, n is 1, $R^{12}$ may be a divalent substituted or unsubstituted hydrocarbon residue with 1 to 20 carbon atoms, preferably a substituted or unsubstituted (cyclo)alkylene residue or arylene residue with 1 to 14 carbon atoms; and $A^{12}$ may be a divalent group selected from —NH—C(=O)—O—, —NH—C(=O)—NH—, and —NH—C(=O)—NR"—, preferably —NH—C(=O)—O—.

In various embodiments, the structural element of formula (III) arises from the reaction of a diisocyanate with a hydroxyl-terminated polymer and, in a second step, the resulting NCO-terminated polymer with a hydroxyl group containing (meth)acrylate. In such embodiments, $R^{11}$ may be a bond or alkylene, $A^{11}$ is —O—C(=O)—NH—, $R^{12}$ is the NCO-bearing residue of the diisocyanate, $A^{12}$ is —NH—C(=O)—O— and $R^{13}$ is the remaining structural element of the hydroxy-modified (meth)acrylate ester part. In these embodiments, $R^{12}$ may be a divalent (1,3,3-trimethylcyclohexyl)methylene group (if IPDI is used as the diisocyanate), 1-methyl-2,4-phenylene (if TDI is used as the diisocyanate) and any other divalent group remaining if any one of the diisocyanates disclosed herein is used. In various embodiments, $R^{13}$ is the remainder of the hydroxyester group of the (meth)acrylate used, for example ethyl, if 2-hydroxyethyl (meth)acrylate was used, or n-butyl, if 4-hydroxybutyl (meth)acrylate was used, or 3-(phenoxy)-2-propyl, if 2-hydroxy-3-phenoxy(meth)acrylate was used.

In various embodiments, preferred diisocyanates used include IPDI, so that $R^{12}$ is 1,3,3-trimethylcyclohexyl)methylene-4-yl.

In various embodiments, the (meth)acrylates used include, without limitation, 2-hydroxyethylacrylate and -methacrylate, 3-hydroxypropylmethacrylate, 4-hydroxybutylacrylate, and 2-hydroxy-3-phenoxyacrylate, so that $R^{13}$ is preferably ethyl, propyl, butyl or 3-(phenoxy)-2-propyl.

In other embodiments, n is 0. In such embodiments, $R^{11}$ can be a bond, $A^{11}$ is —O—C(=O)—NH— and $R^{13}$ is typically an alkylene moiety, such a methylene, ethylene or propylene. In such embodiments, the linking group results from the reaction of an isocyanatoacrylate with an hydroxyterminated polymer.

In various embodiments, $A^2$ is a group of formula (IV)

$$—R^{21}\text{-}A^{21}\text{-}(R^{22}\text{-}A^{22})_m\text{-}R^{23}—\qquad(IV)$$

wherein $R^{21}$, $R^{22}$, and $R^{23}$ are independently a bond or a divalent substituted or unsubstituted hydrocarbon residue with 1 to 20 carbon atoms, preferably a substituted or unsubstituted (cyclo)alkylene or arylene residue with 1 to 14 carbon atoms;

$A^{21}$ and $A^{22}$ are each independently a divalent group selected from —O—C(=O)—NH—, —NH—C(=O)O—, —NH—C(=O)—NH—, —NR"—C(=O)—NH—, —NH—C(=O)—NR"—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR"—, wherein R" can be hydrogen or a hydrocarbon moiety with 1 to 12 carbon atoms, optionally substituted, preferably $C_1$-$C_2$ alkyl or hydrogen; and m is 0 or 1.

Here, the same definitions for "bond" and "substituted", as disclosed above for formula (III), apply, with the only difference being that "substituted" also encompasses that the substituent, in particular of $R^{23}$, is another group of the formula —SiXYZ instead of —C(=O)—$CR^1$=$CH_2$. Again, in various embodiments, it is also encompassed that $R^{22}$ is substituted with another -$A^{22}$-$R^{23}$ moiety, with said $R^{23}$ being linked to another group of formula (II).

If n=0, this means that $A^{22}$ and $R^{22}$ are absent and $A^{21}$ is directly linked to $R^{23}$.

In any case, the orientation of the structural element of formula (IV) is such that $R^{23}$ links to the structural element —SiXYZ of the group of formula (II), or if not present, $A^{22}$ or $A^{21}$.

In various embodiments, $R^{21}$ is a bond or a divalent substituted or unsubstituted hydrocarbon residue with 1 to 20 carbon atoms, preferably an unsubstituted alkylene residue with 1 to 4 carbon atoms, for example methylene, ethylene, propylene, preferably a bond;

$R^{23}$ is a bond or a divalent substituted or unsubstituted hydrocarbon residue with 1 to 20 carbon atoms, preferably an unsubstituted alkylene residue with 1 to 3 carbon atoms, more preferably methylene or propylene; n is 0 or 1, wherein if n is 0, $A^{21}$ is a divalent group selected from —O—, —O—C(=O)—NH—, —NH—C(=O)—NH—, and —NR"—C(=O)—NH—, preferably —O—, —O—C(=O)—NH—, or NH—C(=O)—NH—; and wherein if n is 1, $A^{21}$ is a divalent group selected from —O—, —O—C(=O)—NH—, —NH—C(=O)—NH—, and —NR"—C(=O)—NH—, preferably —O—C(=O)—NH;

$R^{22}$ is a divalent substituted or unsubstituted hydrocarbon residue with 1 to 20 carbon atoms, preferably a substituted or unsubstituted (cyclo)alkylene residue or arylene residue with 1 to 14 carbon atoms; and $A^{22}$ is a divalent group selected from —NH—C(=O)O—, —NH—C(=O)—NH—, and —NH—C(=O)—NR"—, preferably —NH—C(=O)—NH.

Such linking groups arise from the reaction of a hydroxy-terminated polymer with a diisocyanate, as defined above for the (meth)acrylate terminal groups, and the subsequent reaction of the NCO-terminated polymer with an NCO-reactive silane, such as an hydroxysilane or, preferably an aminosilane. Suitable aminosilanes are well known in the art and include, without limitation, 3-aminopropyltrimethoxysilane as well as those disclosed below in relation to the inventive methods.

In various embodiments, $R^{11}$, $R^{21}$ and $R^{23}$ in the general formulae (III) and/or (IV) are selected from a bond, methylene, ethylene, or n-propylene group. $R^{11}$ and $R^{21}$ are preferably a bond. $R^{23}$ is preferably 1,3-propylene.

Alkoxysilane-terminated compounds having a methylene group as binding link to the polymer backbone—so-called "alpha-silanes"—have a particularly high reactivity of the terminating silyl group, leading to reduced setting times and thus to very rapid curing of formulations based on these polymers.

In general, a lengthening of the binding hydrocarbon chain leads to reduced reactivity of the polymers. In particular, "gamma-silanes"—which comprise the unbranched propylene residue as binding link—have a balanced ratio between necessary reactivity (acceptable curing times) and delayed curing (open assembly time, possibility of corrections after bonding). By carefully combining alpha- and gamma-alkoxysilane-terminated building blocks, therefore, the curing rate of the systems can be influenced as desired.

The substituents X, Y and Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein at least one of the substituents X, Y, Z here must be a hydrolyzable group, preferably a $C_1$ to $C_8$ alkoxy or a $C_1$ to $C_8$ acyloxy group, wherein the substituents X, Y and Z are directly bound with the Si atom or the two of the substituents X, Y, Z form a ring together with the Si atom to which they are bound. In preferred embodiments, X, Y and Z are the substituents directly bound with the SI atom. As hydrolyzable groups, preferably alkoxy groups, in particular methoxy, ethoxy, i-propyloxy and i-butyloxy groups, are selected. This is advantageous, since no substances which irritate mucous membranes are released during the curing of compositions comprising alkoxy groups. The alcohols formed by hydrolysis of the residues are harmless in the quantities released, and evaporate. However, acyloxy groups, such as an acetoxy group —O—CO—$CH_3$, can also be used as hydrolyzable groups.

As described above, in preferred embodiments, the polymer(s) A has/have at least one terminal groups of the general formula (II). Each polymer chain thus comprises at least one linking point at which the condensation of the polymers can be completed, splitting off the hydrolyzed residues in the presence of atmospheric moisture. In this way, regular and rapid crosslinkability is achieved so that bonds with good strengths can be obtained. In addition, by means of the quantity and the structure of the hydrolyzable groups—for example by using di- or trialkoxysilyl groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way. In alternative embodiments, these properties can—at least partially—also be provided by additionally using a polymer B, as defined herein.

In preferred embodiments, in the general formula (II), X is preferably an alkyl group and Y and Z are, each independently of one another, an alkoxy group, or X, Y and Z are, each independently of one another, an alkoxy group. In general, polymers comprising di- or trialkoxysilyl groups have highly reactive linking points which permit rapid curing, high degrees of crosslinking and thus good final strengths. The particular advantage of dialkoxysilyl groups lies in the fact that, after curing, the corresponding compositions are more elastic, softer and more flexible than systems comprising trialkoxysilyl groups.

With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have advantages in "cold flow"—the dimensional stability of a corresponding adhesive under the influence of force and possibly temperature.

Particularly preferably, the substituents X, Y and Z in the general formula (II) are, each independently of one another, selected from a hydroxyl, a methyl, an ethyl, a methoxy or an ethoxy group, at least one of the substituents being a hydroxyl group, or a methoxy or an ethoxy group, preferably a methoxy group. Methoxy and ethoxy groups as comparatively small hydrolyzable groups with low steric bulk are very reactive and thus permit a rapid cure, even with low use of catalyst. They are therefore of particular interest for systems in which rapid curing is desirable.

Interesting configuration possibilities are also opened up by combinations of the two groups. If, for example, methoxy is selected for X and ethoxy for Y within the same alkoxysilyl group, the desired reactivity of the terminating silyl groups can be adjusted particularly finely if silyl groups carrying exclusively methoxy groups are deemed too reactive and silyl groups carrying ethoxy groups not reactive enough for the intended use.

In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

In various embodiments, in formula (II), X, Y, and Z are, independently of one another, preferably selected from a hydroxyl, a methyl, an ethyl, a methoxy, or an ethoxy group, wherein at least one of the substituents is a hydroxyl group, or a methoxy or an ethoxy group, preferably all are selected from methoxy or ethoxy, more preferably methoxy. Explicitly covered are thus methyldimethoxysilyl, trimethoxysilyl, triethoxysilyl, and ethyldiethoxysilyl, preferably methyldimethoxysilyl and trimethoxysilyl, more preferably trimethoxysilyl.

It is understood that in case polymer A comprises terminal groups of formula (II) and at least one polymer B is additionally present, the respective terminal groups of formula (II) may be selected independently for polymer A and polymer B and thus allow to further tune composition properties.

The total proportion of the polymers A/B with at least one end group of the general formula (I) and at least one end group of the general formula (II) in the composition according to the invention is preferably 10 to 50 wt. %, more preferably 20 to 40 wt. %, even more preferably 25 to 35 wt. %, based in each case on the total weight of the curable composition.

Methods for generating the polymers A, and insofar only terminal groups of formula (II) are concerned also polymer B, typically comprise reacting the polymer (backbone) that is to be capped with the terminal groups of formula (I) and, optionally, formula (II) with an isocyanate that also comprises the desired terminal group. Said isocyanate may be a compound of formula (Ia)

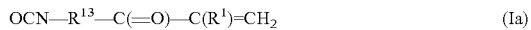

$$\text{OCN}—\text{R}^{13}—\text{C}(=\text{O})—\text{C}(\text{R}^1)=\text{CH}_2 \quad \text{(Ia)}$$

and, optionally, an additional compound of formula (IIa) may be used

$$\text{OCN}—\text{R}^{23}—\text{SiXYZ} \quad \text{(IIa)},$$

wherein $R^{13}$ and $R^{23}$ are independently a bond or a divalent substituted or unsubstituted hydrocarbon residue with 1 to 20 carbon atoms, preferably a substituted or unsubstituted (cyclo)alkylene or arylene residue with 1 to 14 carbon atoms. The polymer backbone is preferably selected from the group consisting of polyoxyalkylenes, poly(meth)acrylates, polyesters, and combinations thereof.

The compounds of formulae (Ia) and (IIa) may be used simultaneously, for example in a mixture so that the reaction with the polymers occurs in parallel, or may be reacted with the polymer successively, e.g. in that first a reaction with compound (Ia) is carried out and then the remaining reactive groups of the polymer are reacted with compound (IIa).

To allow this reaction, the polymer comprises terminal NCO-reactive groups, for example hydroxyl or amino groups. It is understood that in all methods described herein the polymer to be capped by the described terminal groups may be a mixture of polymers.

In preferred embodiments, the polymers used are hydroxy-terminated polymers, e.g. polyols, such as polyether and/or polyester polyols, that react with the isocyanates under the formation of urethane bonds. In such embodiments, the definition of the polyether and polyester polyols above applies to the polymers to be used in these methods. This particularly relates to the molecular weights, polydispersity and functionalities defined above. Generally, while all the polymers described above can have multiple reactive termini that are used for the attachment of the terminal groups described herein, such as multiple hydroxyl groups, thus being polyols, it may be preferable that they comprise two or three such reactive terminal groups for attachment of the terminal groups of formulae (I) and (II), preferably only two, thus being linear polymers. Particularly preferred are diols and triols, more preferred are diols. If triols are used, these are preferably used in combination with diols, for example in a 1:1 molar ratio, more preferably in a 1:>1 molar ratio.

In case the polymers comprise terminal OH groups, the molar ratio of terminal OH groups of the polymer and the NCO groups of the compounds of formula (Ia), and optionally also formula (IIa), ranges from 1:0.5 to 1:1.5, preferably 1:0.9 to 1:1.1, more preferably 1:0.99 to 1:1.01. If alternative NCO-reactive groups are employed, the respective ratios may also apply.

In the resulting reaction, essentially all hydroxy groups react with isocyanate groups forming urethane groups that link the desired terminal group to the polymer backbone.

As in the above-described method the polymers are modified with the desired terminal groups in only one step, the method is also referred to herein as 1-step method.

In an alternative method for producing a radiation curable polymer, the method comprises the 2 steps of:

a) reacting a polymer terminated with an NCO-reactive group, such as an OH-terminated polymer, with a polyisocyanate of formula (V)

$$(\text{OCN})_p—\text{R}^2—\text{NCO} \quad \text{(V)}$$

wherein $R^2$ is a substituted or unsubstituted hydrocarbon residue with 1 to 20 carbon atoms, preferably a substituted or unsubstituted (cyclo)alkylene or arylene residue with 1 to 14 carbon atoms;

p is 1 to 3, preferably 1 or 2, more preferably 1; and b) reacting the resulting NCO-terminated polyoxyalkylene polymer with a compound of formula (Ib)

$$\text{B}^1—\text{R}^{13}—\text{C}(=\text{O})—\text{CR}^1=\text{CH}_2 \quad \text{(Ib)}$$

wherein $B^1$ is an NCO-reactive group, preferably —OH. and, optionally, a compound of formula (IIb)

$$\text{B}^2—\text{R}^{23}—\text{SiXYZ} \quad \text{(IIb)}.$$

wherein $B^2$ is an NCO-reactive group, preferably —N(R")$_2$, wherein R" can be hydrogen or a hydrocarbon moiety with 1 to 12 carbon atoms, optionally substituted, preferably $C_1$-$C_3$ alkyl or hydrogen, more preferably hydrogen;

wherein $R^{13}$ and $R^{23}$ are independently a bond or a divalent substituted or unsubstituted hydrocarbon residue with 1 to 20 carbon atoms, preferably a substituted or unsubstituted (cyclo)alkylene or arylene residue with 1 to 14 carbon atoms; wherein the polymer backbone is selected from the group consisting of polyoxyalkylenes, poly(meth)acrylates, polyesters, and combinations thereof.

"Substituted", as used herein in relation to $R^2$, refers to a saturated or unsaturated hydrocarbon including straight-chain and branched-chain and alicyclic and aromatic groups, in particular (cyclo)alkylene or arylene residue with 1 to 14 carbon atoms, which may be substituted preferably one or more substituents selected from $C_{1-8}$ alkyl, $C_{2-8}$ alkenyl, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms are independently nitrogen, oxygen, or sulfur. Substituted alkyl includes, for example, alkylaryl groups. In some embodiments, substituted also includes that one of the carbon atoms is replaced by a heteroatom, for example heteroalkyl groups. Heteroalkyl groups in which 1 or more carbon atoms are replaced by heteroatoms, particularly selected from O, S, N, and Si, are obtained by the replacement of one or more carbon atoms by heteroatoms. Examples of such heteroalkyl groups are, without limitation, methoxymethyl, ethoxyethyl, propoxypropyl, methoxyethyl, isopentoxypropyl, ethylaminoethyl, trimethoxypropylsilyl, etc. It is generally understood that the substituted $R^2$ depends on the used isocyanate and preferably has a structure that makes the compound of formula (V) any one of the isocyanates specifically disclosed herein.

"Substituted", as used herein in relation to R", includes substituents selected from the group consisting of —O—($C_{1-10}$ alkyl), —O—($C_{6-14}$ aryl), —$NH_2$, —$N(C_{1-10}$ alkyl$)_2$, such as —$N(CH_3)_2$, $C_{1-10}$ alkyl or alkoxy, $C_{2-10}$ alkenyl, $C_{2-10}$ alkynyl, $C_{3-8}$ cycloalkyl, —SiXYZ, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms independently are nitrogen, oxygen, or sulfur.

In various embodiments, $R^2$ is defined as $R^{12}$ and $R^{22}$ above and is the NCO-bearing residue of any one of the diisocyanates disclosed above, for example IPDI, TDI or MDI.

In these methods, the first step serves the purpose to modify the polymers such that they are NCO-terminated. The reactive NCO-termini of the polymer obtained in the first step of the reaction are then used to couple the end-groups of formula (I) and optionally also formula (II) to the polymer.

As described for the one-step method above, also in this method the polymer comprises terminal NCO-reactive groups, for example hydroxyl or amino groups. Also in the two-step method described herein the polymer to be reacted with the polyisocyanate and then capped by the described terminal groups may be a mixture of polymers. Again, in preferred embodiments, the polymers used are hydroxy-terminated polymers, e.g. polyols, such as polyether and/or polyester polyols, that react with the isocyanates under the formation of urethane bonds. In such embodiments, the definition of the polyether and polyester polyols above applies to the polymers to be used in these methods. This particularly relates to the molecular weights, polydispersity and functionalities defined above. Generally, while all the polymers described above can have multiple reactive termini that are used for the attachment of the terminal groups described herein, such as multiple hydroxyl groups, thus being polyols, it may be preferable that they comprise two or three such reactive terminal groups for attachment of the terminal groups of formulae (I) and (II), preferably only two, thus being linear polymers. Particularly preferred are diols and triols, more preferred are diols. If triols are used, these are preferably used in combination with diols, for example in a 1:1 molar ratio, more preferably in a 1:>1 molar ratio.

In all of the described methods, i.e. the one-step and two-step method, appropriate catalysts and reaction conditions, all of which are generally known to those skilled in the art, can be used/employed.

If isocyanate and hydroxyl groups are used, in principle, any compound that can catalyze the reaction of a hydroxyl group and an isocyanato group to form a urethane bond can be used. Some useful examples include: tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters; dibutyltin bisacetylacetonate; titanates such as tetrabutyl titanate and tetrapropyl titanate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, 2,2'-dimorpholinodiethylether, triethylenediamine, morpholine, N-methylmorpholine, 2-ethyl-4-methylimidazole and 1,8-diazabicyclo-(5,4,0)-undecene-7 (DBU); aliphatic carboxylate salts or acetylacetonates of potassium, iron, indium, zinc, bismuth, titanium, cobalt or copper. Some of these catalysts are also disclosed below as components of the invention. Preferred catalysts are metal catalysts based on tin, bismuth, titanium, zinc and cobalt as well as amines. More preferred are catalysts based on tin, bismuth, titanium and the known amine catalysts. The catalyst is preferably present in an amount of from 0.005 to 3.5 wt. % based on the total composition weight.

In the two-step method, the first step, i.e. the functionalization of the polymer termini with NCO groups is preferably carried out at a temperature in the range of 0 to 120° C., more preferably 50 to 100° C., most preferably 70-90° C. The second step of reacting the NCO-terminated polymer with the NCO-reactive group modified (meth)acrylates and silanes is then preferably carried out at a temperature in the range of 0 to 90° C., more preferable 10 to 50° C., most preferably 20-30° C.

The molar ratio of terminal OH groups to polyisocyanate of formula (V) may range from 1:0.5 to 1:1.5, preferably from 1:0.9 to 1:1.1, more preferably from 1:0.99 to 1:1.01. As disclosed for the 1-step method, this ratio ensures that essentially all hydroxy groups are reacted with isocyanates so that essentially a completely NCO-terminated polymer is obtained.

In various embodiments, the molar ratio of unreacted NCO groups after step (a) to the sum of $B^1$ and $B^2$ groups is 1:0.5 to 1:1.5, preferably 1:0.9 to 1:1.0, more preferably 1:0.94 to 1:0.96.

The molar ratio of polymer terminal NCO-reactive groups, such as OH groups, to NCO groups of the polyisocyanate of formula (V) to the NCO-reactive groups of the (meth)acrylate/silane, such as OH or amine groups, may thus be about 1:about 1:about 1, more preferably about 1:about 1:about 0.95. It may be preferred that the amount of (meth)acrylate/silane used is about 5% less with respect to the number of NCO-reactive groups than stochiometrically necessary (as per calculation) for all NCO groups. "About", as used herein in relation to numerical values, typically relates to said value±10%, preferably ±5%.

The amount of compounds of formula (Ib) and (IIb) may be selected such that essentially all NCO groups are reacted with the respective compounds. As in all methods described herein, in case both types of compounds for both types of terminal groups are used, the second step may be subdivided in a first step in which the first compound, for example the compound of formula (Ib) is reacted with the NCO-terminated polymer, and a second step in which the remaining NCO groups are reacted with the compound of formula (IIb).

In various embodiments, the polyisocyanate of formula (V) is a diisocyanate selected from the group consisting of ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, 4,4'-diphenylmethane diisocyanate (MDI), and the isomeric mixtures thereof, the partially or completely hydrogenated cycloalkyl derivatives of MDI, alkyl-substituted diphenylmethane diisocyanates, 4,4'-diisocyanatophenylperfluorethane, phthalic acid-bis-isocyanatoethyl ester, 1-chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates, diisocyanates of dimer fatty acids, or mixtures of two or more of the afore-mentioned diisocyanates, preferably IPDI, TDI and MDI.

In various embodiments, the compound of formula (Ib) is selected from the group consisting of hydroxyethylmethacrylate, hydroxyethylacrylate, hydroxypropylacrylate, hydroxypropylmethacrylate, hydroxybutylmethacrylate, hydroxybuylacrylate, acrylic acid, methacrylic acid. The hydroxyethyl(meth)acrylates are preferably 2-hydroxyethyl (meth)acrylates. The hydroxypropyl(meth)acrylates are preferably 2- or 3-hydroxypropyl or 2-hydroxy-1-methylethyl(meth)acrylates. The hydroxybutyl(meth)acrylates are preferably 2-, 3- or 4-hydroxybutyl- or 2- or 3-hydroxy-1-methylpropyl(meth)acrylate. Generally, if not explicitly indicated otherwise, of all acrylates specifically described herein, the corresponding methacrylates may be used and vice versa. Furthermore, it is understood that wherever reference is made herein to acrylates in general, methacrylates may also be used and vice versa. Additional modified (meth)acrylates have been described above.

In various embodiments, the compound of formula (IIb) is selected from the group consisting of 3-aminopropyltrimethoxysilane, 3-aminopropyltriethoxysilane, 3-aminopropylmethyldimethoxysilane, N-(2-aminoethyl)-3-aminopropyltrimethoxysilane, 3-(trimethoxysilyl)-n-(3-(trimethoxysilyl)propyl)-1-propanamine (CAS 82985-35-1), 3-triethoxysilyl-N-(3-triethoxysilylpropyl)propan-1-amine (CAS 13497-18-2), and N-(Phenylamino) methyltrimethoxysilane.

The invention also relates to compositions that contain the polymers obtainable according to any one of the methods described herein as polymer(s) A and/or B. Depending on the method used and the compounds used therein, these methods result not only in polymers that contain varying amounts of the terminal groups of formula (I) but also polymers that contain both groups of formula (I) and groups of formula (II) as well as polymers that only comprise terminal groups of formula (II). Such mixtures of polymers that comprise both types of endgroups have the desired dual curing properties described above. It is in any case preferred that these mixtures of polymers do comprise polymers that have endgroups of formula (I) and preferably also formula (II) on the same polymer chain.

Polymers A and/or B are in typically contained in the inventive compositions in amounts of 0.01 to 90% by weight, preferably 0.1 to 80 wt.-% m, more preferably 0.5 to 75 wt.-%, such as 10 to 75 wt.-%, 25 to 75 wt.-%, 30 to 80 wt.-% or 30 to 90 wt.-%. These amounts relate to the total amounts of all polymers A/B in the compositions.

The compositions according to the invention optionally comprise as an additional component at least one compound of the general formula (VI)

(II)

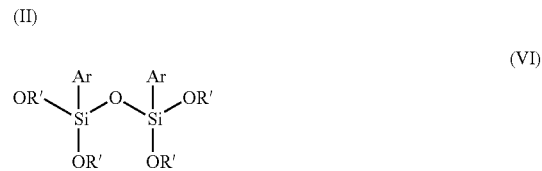

(VI)

wherein R' is same or different and is, independently from one another, selected from the group consisting of a hydrogen atom and hydrocarbon residues having 1 to 12 carbon atoms, and Ar is selected from aryl groups. In preferred embodiments, the aryl group is a phenyl group and/or R' in the general formula (II) is selected from a methyl or ethyl group, more preferably a methyl group. The most preferred is diphenyltetramethoxydisiloxane.

It has been shown that, when using the at least one compound of the general formula (VI) above, the compositions according to the invention have an improved tensile strength and elongation.

The proportion of compound of the general formula (VI) in the curable composition according to the invention is preferably 1 to 30 wt. %, more preferably 2 to 20 wt. %, even more preferably 3 to 15 wt. % based on the total weight of the composition.

The curable composition according to the invention may further comprise at least one silicone oligomer of the general formula (VII)

(III)

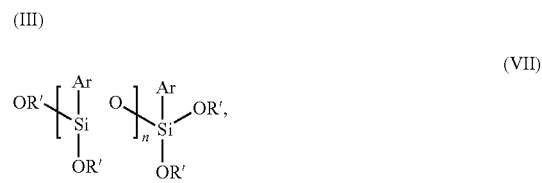

(VII)

wherein R' is same or different and is, independently from one another, selected from the group consisting of a hydrogen atom and hydrocarbon residues having 1 to 12 carbon atoms, preferably a methyl or ethyl group, more preferably a methyl group, Ar is selected from aryl groups, preferably a phenyl group, and n is an integer selected from 2 to 10, preferably 2 to 4, more preferably 2 to 3, most preferably 3.

The composition according to the invention may further comprise at least one filler. The at least one filler, may, without limitation, be selected from chalk, powdered limestone, silica, such as precipitated and/or pyrogenic silica, zeolites, bentonites, magnesium carbonate, kieselguhr, alumina, clay, tallow, titanium oxide, iron oxide, zinc oxide, sand, quartz, flint, mica, powdered glass and other ground minerals. In preferred embodiments, the filler(s) are precipitated and/or pyrogenic silica. Furthermore, organic fillers can also be used, in particular carbon black, graphite, wood fibers, wood flour, sawdust, cellulose, cotton, pulp, wood chips, chopped straw, chaff, ground walnut shells and other short-cut fibers. Furthermore, short fibers such as glass fibers, glass filament, polyacrylonitrile, carbon fibers, Kevlar fibers or polyethylene fibers can also be added. Aluminum powder is also suitable as a filler. In addition, hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®. These are composed of inorganic or organic substances, each with a diameter of 1 mm or less, preferably of 500 μm or less. Generally, fillers which make the preparations thixotropic are preferred. These fillers are also described as rheological auxiliaries.

The filler(s) are preferably used in a quantity of 0.01 to 60 wt. %, more preferably 0.1 to 50 wt. %, for example 1 to 45 wt. %, 10 to 45, 20 to 45, 25 to 45, 10 to 50 or 20 to 50 wt.-% based on the total weight of the composition according to the invention. An individual filler or a combination of several fillers can be used.

In various embodiments, the filler comprises silica, preferably in an amount of 1 to 30, more preferably 1 to 20, even more preferably 5 to 15 wt.-%, relative to the total weight of the composition. The silica may be pyrogenic silica.

For example, a highly disperse silica with a BET surface area (DIN ISO 9277; DIN 66132) of 10 to 500 m²/g is used as a filler. Preferably, coated silicas with a BET surface area of 100 to 400, more preferably 100 to 300, in particular 150 to 300 and most particularly preferably 160 to 300 m²/g, are used. Suitable silicas are for example commercially available from Wacker under the tradename HDK®, including HDK® H18.

In various embodiments, the filler comprises chalk (calcium carbonate), optionally surface coated with fatty acids, preferably in an amount of 25 to 45, more preferably 30 to 40 wt.-%, relative to the total weight of the composition.

Cubic, non-cubic, amorphous and other modifications of calcium carbonate can be used as chalk. Preferably, the chalks used are surface treated or coated. As a coating agent, preferably fatty acids, fatty acid soaps and fatty acid esters are used, for example lauric acid, palmitic acid or stearic acid, sodium or potassium salts of such acids or their alkyl esters. In addition, however, other surface-active substances, such as sulfate esters of long-chain alcohols or alkylbenzenesulfonic acids or their sodium or potassium salts or coupling reagents based on silanes or titanates, are also suitable. The surface treatment of chalks is often associated with an improvement in processability and adhesive strength and also the weathering resistance of the compositions.

Depending on the desired property profile, precipitated or ground chalks or mixtures thereof can be used. Ground chalks can be produced, for example, from natural lime, limestone or marble by mechanical grinding, using either dry or wet methods. Depending on the grinding method, fractions having different average particle sizes can be obtained. Advantageous specific surface area values (BET) are between 1.5 m²/g and 50 m²/g.

In preferred embodiments, chalk and/or silica, for example both, are used as fillers. In such embodiments where both are used, silica is used in amounts of preferably 5 to 15 wt. % and chalk in amounts of preferably 25-45, more preferably 30-40 wt. %, relative to the total weight of the composition, while not exceeding the upper limit of 50 wt. % fillers in total.

If used, zeolites, preferably alkali aluminosilicates are used, for example sodium-potassium aluminosilicates of the general empirical formula $aK_2O*bNa_2O*Al_2O_3*2SiO*nH_2O$ with $0<a$, $b<1$ and $a+b=1$. The pore opening of the zeolite or zeolites used is just large enough to accept water molecules. Accordingly, an effective pore opening of the zeolites of less than 0.4 nm is preferred. Particularly preferably, the effective pore opening is 0.3 nm±0.02 nm. The zeolite(s) is/are preferably used in the form of a powder.

The composition according to the invention may further comprise at least one catalyst for cross-linking the terminal silane groups. The at least one catalyst may thus serve as a curing catalyst (condensation catalyst) for the polymers having terminal groups of formula (II). For curing the polymers via the terminal groups of formula (I), the polymers or polymer compositions are exposed to radiation, in particular UV radiation.

In various embodiments where a catalyst is used for the moisture curable groups, the curing catalyst may be a tin compound, preferably an organotin compound or an inorganic tin salt. Tin in these tin compounds is preferably bivalent or tetravalent. Suitable inorganic tin salts are, for example, tin(II) chloride and tin(IV) chloride. Organotin compounds (tin organyles) are used preferably as the tin compounds, however. Suitable organotin compounds are, for example, the 1,3-dicarbonyl compounds of bivalent or tetravalent tin, for example, the acetylacetonates such as di(n-butyl)tin(IV) di(acetylacetonate), di(n-octyl)tin(IV) di(acetylacetonate), (n-octyl)(n-butyl)tin(IV) di(acetylacetonate); the dialkyl tin(IV) dicarboxylates, for example, di-n-butyltin dilaurate, di-n-butyltin maleate, di-n-butyltin diacetate, di-n-octyltin dilaurate, di-n-octyltin diacetate, or the corresponding dialkoxylates, for example, di-n-butyltin dimethoxide; oxides of tetravalent tin, for example, dialkyltin oxides, such as, for example, di-n-butyltin oxide and di-n-octyltin oxide; and the tin(II) carboxylates such as tin(II) octoate or tin(II) phenolate.

Also suitable are tin compounds of ethyl silicate, dimethyl maleate, diethyl maleate, dioctyl maleate, dimethyl phthalate, diethyl phthalate, dioctyl phthalate, such as, for example, di(n-butyl)tin(IV) di(methyl maleate), di(n-butyl)tin(IV) di(butyl maleate), di(n-octyl)tin(IV) di(methyl maleate), di(n-octyl)tin(IV) di(butyl maleate), di(n-octyl)tin (IV) di(isooctyl maleate); and di(n-butyl)tin(IV) sulfide, $(n-butyl)_2Sn(SCH_2COO)$, $(n-octyl)_2Sn(SCH_2COO)$, $(n-octyl)_2Sn(SCH_2CH_2COO)$, $(n-octyl)_2Sn(SCH_2CH_2COOCH_2CH_2OCOCH_2S)$, $(n-butyl)_2Sn(SCH_2COO-i-C_8H_{17})_2$, $(n-octyl)_2Sn(SCH_2COO-i-C_8H_{17})_2$, and $(n-octyl)_2Sn(SCH_2COO-n-C_8H_{17})_2$.

In some embodiments, the tin compound is selected from 1,3-dicarbonyl compounds of bivalent or tetravalent tin, the dialkyltin(IV) dicarboxylates, the dialkyltin(IV) dialkoxylates, the dialkyltin(IV) oxides, the tin(II) carboxylates, and mixtures thereof.

In various embodiments, the tin compound is a dialkyltin (IV) dicarboxylate, particularly di-n-butyltin dilaurate or di-n-octyltin dilaurate.

Additionally or alternatively, other metal-based condensation catalysts may be used, including, without limitation, compounds of titanium such as organotitanates or chelate complexes, cerium compounds, zirconium compounds, molybdenum compounds, manganese compounds, copper compounds, aluminum compounds, or zinc compounds or their salts, alkoxylates, chelate complexes, or catalytically active compounds of the main groups or salts of bismuth, lithium, strontium, or boron.

Further suitable (tin-free) curing catalysts are, for example, organometallic compounds of iron, particularly the 1,3-dicarbonyl compounds of iron such as, e.g., iron(III) acetylacetonate.

Boron halides such as boron trifluoride, boron trichloride, boron tribromide, boron triiodide, or mixtures of boron halides can also be used as curing catalysts. Particularly preferred are boron trifluoride complexes such as, e.g., boron trifluoride diethyl etherate, which as liquids are easier to handle than gaseous boron halides.

Further, amines, nitrogen heterocycles, and guanidine derivatives are suitable in general for catalysis. An especially suitable catalyst from this group is 1,8-diazabicyclo [5.4.0]undec-7-ene (DBU).

Titanium, aluminum, and zirconium compounds, or mixtures of one or more catalysts from one or more of the just mentioned groups may also be used as catalysts.

Suitable as titanium catalysts are compounds that have hydroxy groups and/or substituted or unsubstituted alkoxy groups, therefore titanium alkoxides of the general formula

$Ti(OR^z)_4$, where $R^z$ is an organic group, preferably a substituted or unsubstituted hydrocarbon group having 1 to 20 C atoms, and the 4 alkoxy groups —$OR^z$ are identical or different. Further, one or more of the —$OR^z$ groups can be replaced by acyloxy groups —$OCOR^z$.

Likewise suitable as titanium catalysts are titanium alkoxides in which one or more alkoxy groups are replaced by a hydroxy group or halogen atoms.

Further, titanium chelate complexes can be used.

Aluminum catalysts can also be used as curing catalysts, e.g., aluminum alkoxides

$Al(OR^z)_3$, where $R^z$ has the above meaning; i.e., it is an organic group, preferably a substituted or unsubstituted hydrocarbon group having 1 to 20 C atoms and the three $R^z$ groups are identical or different. In the case of aluminum alkoxides as well, one or more of the alkoxy groups can be replaced by acyloxy groups —$OC(O)R^z$.

Further, aluminum alkoxides can be used in which one or more alkoxy groups are replaced by a hydroxy group or halogen atoms.

Of the described aluminum catalysts, the pure aluminum alcoholates are preferred in regard to their stability to moisture and the curability of the mixtures to which they are added. In addition, aluminum chelate complexes are preferred.

Suitable as zirconium catalysts are, e.g.: tetramethoxyzirconium or tetraethoxyzirconium.

Diisopropoxyzirconium bis(ethyl acetoacetate), triisopropoxyzirconium (ethyl acetoacetate), and isopropoxyzirconium tris(ethyl acetoacetate) are used with very particular preference.

Further, zirconium acylates can be used, for example.

Halogenated zirconium catalysts can also be used.

Further, zirconium chelate complexes can also be used.

In addition, carboxylic acid salts of metals or also a mixture of a number of such salts can be employed as curing catalysts, whereby these are selected from the carboxylates of the following metals: calcium, vanadium, iron, zinc, titanium, potassium, barium, manganese, nickel, cobalt, and/or zirconium.

Of the carboxylates, the calcium, vanadium, iron, zinc, titanium, potassium, barium, manganese, and zirconium carboxylates are preferred, because they exhibit a high activity. Calcium, vanadium, iron, zinc, titanium, and zirconium carboxylates are particularly preferred. Iron and titanium carboxylates are very particularly preferred.

The compositions contain the curing catalyst preferably in an amount of from about 0.01 to 5.0% by weight, preferably 0.1 to 3.0% by weight, more preferably 0.2 to 2.5% by weight, based in each case on the total weight of the composition. If a mixture of different catalysts is used, the amounts refer to the total amount in the composition.

The compositions of the invention crosslink in the presence of moisture and in so doing cure with the formation of Si—O—Si bonds.

The composition according to the invention may further comprise at least one catalyst for promoting the crosslinking of the (meth)acrylate terminal groups. The at least one catalyst may then be a photoinitiator for the polymers having terminal groups of formula (I). For curing the polymers via the terminal groups of formula (I), the polymers or polymer compositions are exposed to radiation, in particular UV radiation, said radiation activating the photoinitiator. Photoinitiators may be radical or cationic photoinitiators. Suitable compounds are well-known in the art and include, without limitation, benzoin ethers, such as benzoin methyl ether and benzoin isopropyl ether, substituted acetophenones, such as 2,2-diethoxyacetophenon (commercially available under the tradename Irgacure 651® from BASF SE), 2,2-dimethoxy-2-phenyl-1-phenylethanone, dimethoxyhydroxyacetophenone, substituted a-ketols, such as 2-methoxy-2-hydroxypropiophenone, aromatic sulfonylchlorides, such as 2-naphthyl sulfonyl chloride, and photoaktive oximes, such as 1-phenyl-1,2-propandion-2-(O-ethoxycarbonyl)oxime. The mentioned and further suitable photoinitiators can comprise the following residues: benzophenone-, acetophenone-, benzile-, benzoin-, hydroxyalkylphenone-, phenylcyclohexylketone-, anthrachinon-, trimethylbenzoylphosphinoxide-, methylthiophenylmorpholinketone-, aminoketone-, azobenzoin-, thioxanthon-, hexarylbisimidazole-, triazin-, or Fluorenone, wherein each of these residues may additionally be substituted with one or more halogen atoms and/or one or more alkoxy groups and/or one or more amino or hydroxy groups. An overview over suitable photoinitiators can be found in Fouassier: "*Photoinititation, Photopolymerization and Photocuring: Fundamentals and Applications*", Hanser-Verlag, MOnchen 1995. In addition, reference is made to Carroy et al. in "Chemistry and Technology of UV and EB Formulation for Coatings, Inks and Paints", Oldring (Hrsg.), 1994, SITA, London. One specific example of a suitable compound is ethyl (2, 4, 6-trimethylbenzoyl)-phenyl-phosphinate.

The compositions contain the photoinitiators preferably in an amount of from about 0.01 to 5.0% by weight, preferably 0.1 to 4.0% by weight, more preferably 0.5 to 3% by weight, based in each case on the total weight of the composition. If a mixture of different catalysts is used, the amounts refer to the total amount in the composition.

The composition according to the invention may comprise further ingredients in addition to the components mentioned hitherto, which can contribute to the expression of desired properties. These further ingredients may include, without limitation, plasticizers, reactive diluents, adhesion promoters, moisture scavengers, crosslinking agents, and light/UV stabilizers.

A plasticizer is understood to be a substance which reduces the viscosity of the composition and thus makes processing easier, and in addition improves flexibility and extensibility of the compositions.

The plasticizer is preferably selected from a fatty acid ester, a dicarboxylic acid ester (except cyclohexanedicarboxylic acid dialkyl ester), an ester of epoxidized fatty acids or fatty acids carrying OH groups, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer and a chlorinated paraffin, and mixtures of two or more thereof. By the careful selection of one of these plasticizers or of a specific combination, further advantageous properties of the composition according to the invention, for example gelling properties of the polymers, low-temperature elasticity or low-temperature resistance or antistatic properties, can be achieved.

Among the polyether plasticizers, preferably end-capped polyethylene glycols are used, for example polyethylene or polypropylene glycol di-$C_{1-4}$-alkyl ethers, in particular the dimethyl or diethyl ethers of diethylene glycol or dipropylene glycol, and mixtures of two or more thereof. Also suitable as plasticizers are, for example, esters of abietic acid, butyric acid ester, acetic acid ester, propionic acid ester, thiobutyric acid ester, citric acid ester and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, DOsseldorf). In addition, the pure or mixed ethers of monofunctional, linear or branched $C_{4-16}$ alcohols or mixtures of two or more different ethers of such alcohols are suitable as plasticizers, for example dioctyl ether (available as Cetiol OE, Cognis Deutschland GmbH, DOsseldorf). Likewise suitable as plasticizers within the framework of the present invention are diurethanes, which can be produced e.g. by reaction of diols having OH end groups with monofunctional isocyanates, by selecting the stoichiometry so that substantially all free OH groups react fully. Any excess isocyanate can then be removed from the reaction mixture, e.g. by distillation. Another method for producing diurethanes consists in the reaction of monofunctional alcohols with diisocyanates, wherein as far as possible all NCO groups react fully.

In principle, phthalic acid esters can also be used as plasticizers, but because of their toxicological potential these are not preferred.

The total quantity of plasticizer(s) in curable compositions according to the invention is for preference 1 to 30 wt. %, preferably 5 to 25 wt. % and particularly preferably 10 to 20 wt. %, based in each case on the total weight of the curable composition.

Too high a viscosity of the composition according to the invention for certain applications can also be reduced in a simple and useful manner by using a reactive diluent, without signs of separation (e.g. plasticizer migration) appearing in the cured material. The reactive diluent preferably has at least one functional group which reacts with e.g. moisture or atmospheric oxygen after application. Examples of these groups are silyl groups, isocyanate groups, vinylically unsaturated groups and polyunsaturated systems. As reactive diluent, it is possible to use any compounds which are miscible with the composition according to the invention with a reduction of the viscosity and have at least one group that is reactive with the binder, individually or as a combination of several compounds. The viscosity of the reactive diluent is preferably less than 20,000 mPas, particularly preferably about 0.1-6000 mPas, most particularly preferably 1-1000 mPas (Brookfield RVT, 23° C., spindle 7, 10 rpm).

As reactive diluents it is possible to use for example the following substances: polyalkylene glycols reacted with isocyanatosilanes (for example Synalox 100-50B, DOW), alkyltrimethoxysilanes, alkyltriethoxysilane, such as methyltrimethoxysilane, methyltriethoxysilane and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (10 Trimethoxy), isooctyltriethoxysilane (10 Triethoxy, Wacker), N-trimethoxysilylmethyl-O-methylcarbamate (XL63, Wacker), N-dimethoxy(methyl)silylmethyl-O-methylcarbamate (XL65, Wacker), hexadecyltrimethoxysilane, 3-octanoylthio-1-propyltriethoxysilane and partial hydrolyzates of these compounds. Furthermore, the following polymers from Kaneka Corp. can also be used as reactive diluents: MS S203H, MS S303H, MS SAT 010 and MS SAX 350. Also suitable as reactive diluents are polymers which can be produced from an organic backbone by grafting with a vinylsilane or by reaction of polyol, polyisocyanate and alkoxysilane.

Suitable as polyols for producing a reactive diluent are e.g. aliphatic alcohols include, for example, ethylene glycol, propylene glycol and higher glycols, such as polypropylene glycol, as well as other polyfunctional alcohols. The polyols can additionally comprise other functional groups, such as e.g. esters, carbonates, amides. To produce a reactive diluent by reaction of polyol with polyisocyanate and alkoxysilane, the corresponding polyol component is reacted in each case with an at least difunctional isocyanate. Suitable as the at least difunctional isocyanate is in principle any isocyanate having at least two isocyanate groups, but within the framework of the present invention, compounds having two to four isocyanate groups, in particular two isocyanate groups, are generally preferred. Among the alkoxysilyl groups, the di- and trialkoxysilyl groups are preferred.

The polyisocyanates described above are also suitable as polyisocyanates for producing a reactive diluent.

Further reactive diluents or liquid fillers that may be used include, without limitation, isobornyl acrylate. These compounds may be used in amounts of up to 70% by weight, such as 0.1 to 60% by weight or 0.5 to 55% by weight, such as 10 to 50 wt.-%, for example about 20, about 25, about 30, about 35, about 40, about 45 or about 50 wt.-% relative to the total weight of the composition. It has been found that this additive(s) are particularly beneficial for improving the mechanical properties of the hardened (cured) compositions.

To reduce the viscosity of the composition according to the invention, solvents can also be used as well as or instead of a reactive diluent. Suitable as solvents are aliphatic or aromatic hydrocarbons, halogenated hydrocarbons, alcohols, ketones, ethers, esters, ester alcohols, keto alcohols, keto ethers, keto esters and ether esters. Preferably, however, alcohols are used since in this case the storage stability increases. $C_1$-$C_{10}$ alcohols are particularly preferred, particularly methanol, ethanol, i-propanol, isoamyl alcohol and hexanol.

The composition according to the invention can additionally comprise an adhesion promoter. An adhesion promoter is understood to be a substance which improves the adhesion properties of adhesive layers on surfaces. It is possible to use conventional adhesion promoters known to the person skilled in the art (tackifiers) individually or as a combination of several compounds. Suitable examples are resins, terpene oligomers, coumarone/indene resins, aliphatic, petrochemical resins and modified phenolic resins. Suitable within the framework of the present invention are, for example, hydrocarbon resins, as obtained by polymerization of terpenes, principally α- or p-pinene, dipentene or limonene. The polymerization of these monomers generally takes place cationically with initiation by Friedel-Crafts catalysts. The terpene resins also include copolymers of terpenes and other monomers, e.g. styrene, a-methylstyrene, isoprene and the like. The above resins are used e.g. as adhesion promoters for pressure-sensitive adhesives and coating materials. Also suitable are the terpene-phenolic resins which are produced by acid-catalyzed addition of phenols to terpenes or rosin. Terpene-phenolic resins are soluble in most organic solvents and oils and are miscible with other resins, waxes and rubber. Likewise within the framework of the present invention, the rosins and derivatives thereof, for example their esters or alcohols, are suitable as adhesion promoters in the above sense. Silane adhesion promoters, in particular aminosilanes, are particularly suitable.

In a special embodiment of the curable composition according to the invention, the composition encompasses a silane of the general formula (VIII)

$$R^{1'}R^{2'}N-R^{3'}-SiXYZ \quad (VIII)$$

as adhesion promoter, wherein R1' and R2' are, independently of one another, a hydrogen or $C_1$ to $C_8$ alkyl residues that may be substituted, in particular with an amino or aminoalkyl group, R3' is a divalent hydrocarbon residue having 1 to 12 carbon atoms, optionally comprising a heteroatom, and X, Y, Z are, each independently of one another, selected from a hydroxyl group or $C_1$ to $C_8$ alkyl, $C_1$ to $C_8$ alkoxy or $C_1$ to $C_8$ acyloxy groups, at least one of the substituents X, Y, Z being a $C_1$ to $C_8$ alkoxy or $C_1$ to Cs acyloxy group. Compounds of this type naturally exhibit a high affinity to the binding polymer components of the curable composition according to the invention, but also to a wide range of polar and nonpolar surfaces, and therefore contribute to the formation of a particularly stable bond between the adhesive composition and the particular substrates to be bonded.

The linking group $R^{3'}$ can, for example, be a linear, branched or cyclic, substituted or unsubstituted alkylene residue. Nitrogen (N) or oxygen (O) may be contained therein as a heteroatom. If X, Y and/or Z are an acyloxy group, this can be e.g., the acetoxy group —OCO—$CH_3$.

Suitable aminosilane adhesion promoters are for example commercially available under the tradename Geniosil® from Wacker, including Geniosil® GF91.

One or more adhesion promoter(s) is/are preferably contained in the curable composition according to the invention in a quantity of 0.1 to 5 wt. %, more preferably 0.2 to 2 wt. %, in particular 0.3 to 1 wt. %, based in each case on the total weight of the composition.

The composition according to the invention can additionally comprise UV stabilizers. Preferably, the proportion of the UV stabilizers in the composition according to the invention is up to about 2 wt. %, in particular up to 1 wt. %. Particularly suitable as UV stabilizers are the so-called hindered amine light stabilizers (HALS). For example, a UV stabilizer can be used which carries a silyl group and is incorporated into the end product during crosslinking or curing. Furthermore, benzotriazoles, benzophenones, benzoates, cyanoacrylates, acrylates, sterically hindered phenols, phosphorus and/or sulfur can also be added. The curable composition according to the invention preferably comprises at least one bis(piperidyl) dicarboxylic acid diester, for example bis(2,2,6,6-tetramethyl-4-piperidyl) sebacate, or a benzotriazol, for example 2-(2H-Benzotriazol-2-yl)-4,6-di-tert-pentylphenol. Such light stabilizers are available under the tradename Tinuvin® from BASF SE. They are typically used in amounts of 0.01 to 5 wt. %, preferably 0.1 to 3 wt. %, relative to the total weight of the composition.

It is often useful to stabilize the composition according to the invention further against moisture penetration in order to increase the shelf life even more. Such an improvement in shelf life can be achieved, for example, by the use of drying agents. Suitable as drying agent are all compounds that react with water to form a group that is inert towards the reactive groups present in the composition while undergoing the smallest possible changes in their molecular weight. Furthermore, the reactivity of the drying agents towards moisture that has penetrated into the composition must be higher than the reactivity of the end groups of the silyl group-containing polymer according to the invention present in the composition. Isocyanates, for example, are suitable as drying agent.

Advantageously, silanes are also used as drying agent, e.g. vinylsilanes such as 3-vinylpropyltriethoxysilane, oxime silanes such as methyl-O,O',O"-butan-2-one trioximosilane or O,O',O",O'"-butan-2-one tetraoximosilane (CAS no. 022984-54-9 and 034206-40-1) or benzamidosilanes such as bis(N-methylbenzamido)methylethoxysilane (CAS no. 16230-35-6) or carbamatosilanes such as carbamatomethyltrimethoxysilane. However, the use of methyl-, ethyl- or vinyltrimethoxysilane, tetramethyl- or tetraethylethoxysilane is also possible. Particularly preferred here are vinyltrimethoxysilane and tetraethoxysilane in terms of efficiency and costs. Also suitable as drying agent are the above-mentioned reactive diluents, provided that they have a molecular weight ($M_n$) of less than about 5,000 g/mol and terminal groups whose reactivity with penetrating moisture is at least as great as, preferably greater than, the reactivity of the reactive groups of the silyl group-containing polymer according to the invention. Finally, alkyl orthoformates or orthoacetates can also be used as drying agent, for example methyl or ethyl orthoformate or methyl or ethyl orthoacetate. Generally, the composition according to the invention preferably comprises 0.01 to 10 wt. % drying agent, preferably 0.1 to 5 wt. %, based on the total weight of the composition.

Suitable crosslinking or coupling agents include, without limitation, (methacryloxymethyl)methyldimethoxysilane, (methacryloxypropyl)methyldimethoxysilane, (acryloxymethyl)methyldimethoxysilane, (acryloxypropyl)methyldimethoxysilane, (methacryloxymethyl)trimethoxysilane, (methacryloxypropyl)trimethoxysilane, (acryloxymethyl) trimethoxysilane, (acryloxypropyl)trimethoxysilane, methacryloxytrimethoxysilane, acryloxytrimethoxysilane, for example (methacryloxymethyl)methyldimethoxysilane commercially available from Wacker under the tradename Geniosil® XL32.

The curable composition according to the invention preferably comprises the following components in the stated proportions by weight:
at least one polymer A/B having at least one terminal group
of the general formulae (I) and (II) 0.1 to 80 wt. %,
at least one filler 1 to 50 wt. %,
at least one moisture curing catalyst 0.01 to 5.0 wt. %,
at least one photoinitiator 0.01 to 5.0 wt.-%
one or more auxiliary substance(s) 0 to 15 wt. %,
wherein the proportions by weight add up to 100 wt. % and the proportions by weight are based on the total weight of the curable composition.

The term "auxiliary substances" covers components that are present in minor quantities, for example adhesion promoters, water scavengers, UV stabilizers, reactive diluents, crosslinkers, anti-ageing agents, rheological auxiliaries, pigments or pigment pastes, fungicides, flame retardants and/or solvents.

In preferred embodiments, the curable composition according to the invention preferably comprises the following components in the stated proportions by weight:
at least one polymer A/B having at least one terminal group
of the general formulae (I) and (II) 0.5 to 75 wt. %,
at least one filler 1 to 50 wt. %,
at least one moisture curing catalyst 0.01 to 5.0 wt. %,
at least one photoinitiator 0.01 to 5.0 wt.-%
at least one moisture scavenger 0.1 to 5.0 wt. %,
at least one adhesion promoter 0.2 to 2.0 wt. %
at least one light stabilizer 0.1 to 3.0 wt. %,
one or more auxiliary substance(s) 0 to 10 wt. %,
wherein the proportions by weight add up to 100 wt. % and the proportions by weight are based on the total weight of the curable composition.

With regard to the preferred representatives of the individual components and the preferably used quantities thereof, the statements made above in the description of the respective components apply.

The production of the composition according to the invention takes place by known methods by intimate mixing of the components in suitable dispersing apparatus, for example a high-speed mixer. Alternatively or additionally, the composition may be compounded. Compounding may be achieved in a reactor or preferably by extrusion. For example, the compounding may be achieved by extrusion using a twin screw with a multifeeder system.

The compositions of the invention are in form of a paste. These pastes are preferably shear-thinning and/or thixotropic, i.e. their viscosity is decreased when subjected to shear forces. The pastes typically have a yield point, i.e. at room temperature (20° C.) and standard pressure (1013 mbar) they substantially do not flow or creep as long as there are no external forces applied, such as shear forces. Such a yield point ensures that the material once extruded to form a 3D object is stable enough to maintain the form until curing is completed.

The decrease is preferably such that they are extrudable by typical equipment for 3D printing applications in which viscous liquids are used. This may, for example, mean that when subjected to shear forces the ratio of the viscosity of the composition at a shear rate of 1/s to the viscosity at a shear rate of 5/s at 25° C. is at least 2.0, preferably 2.5 or more, more preferably 3.0 or more. In various embodiments, the compositions of the invention show shear-thinning/thixotropic behaviour when subjected to shear forces such that the ratio of the viscosity of the composition at a shear rate of 1/s to the viscosity at a shear rate of 10/s at 25° C. is at least 2, preferably 4.0 or more, more preferably 5.0 or more. In various embodiments, the compositions of the invention show shear-thinning/thixotropic behaviour when subjected to shear forces such that the ratio of the viscosity of the composition at a shear rate of 1/s to the viscosity at a shear rate of 40/s at 25° C. is at least 5.0, preferably 7.0 or more, more preferably 10.0 or more. Viscosities as described herein if not explicitly indicated otherwise, are determined using MCR302 rheometer from Anton-Paar GmbH using the method as set forth in BS EN ISO 3219:1995. Specifically, the measuring conditions are as follows: Geometry: 25 mm plate/plate geometry; Gap: 0.25 mm, F=0N, under nitrogen, 25° C., Shear rate 0.3-40 s$^{-1}$. For extrapolation Casson's model was used.

While there is principally no upper limit, it may be preferred that the shear-thinning/thixotropic properties are not such that the ratio of the viscosity of the composition at a shear rate of 1/s to the viscosity at a shear rate of 10/s at 25° C. exceeds 100, preferably not exceeds 50, more preferably not exceeds 30.

It is furthermore a property of the compositions of the invention that they have a yield stress (Casson yield stress (value)) of greater than 25, preferably 50 or more, more preferably 75 or more. Even more preferred are values exceeding 100, exceeding 150 or exceeding 200. These values refer to the respective values at 25° C.

The yield stress can be calculated using the formula:

$$\tau^{\frac{1}{2}} = k_{oc}^{\frac{1}{2}} + k_c^{\frac{1}{2}} \gamma^{\frac{1}{2}}$$

Wherein $\tau$ is the shear stress, $k_{oc}$ is the Casson yield stress, kc is the Casson plastic viscosity and $\gamma$ is the shear rate. In a graphic representation of the square root of $\tau$ (shear stress) against the square root of $\gamma$ (shear rate), the square root of $k_c$ is thus the slope and the square root of $k_{oc}$ the intercept.

Shear rate and shear stress are measured/determined using BS EN ISO 3219:1995. Specifically, the measuring conditions are as follows: Geometry: 25 mm plate/plate geometry; Gap: 0.25 mm, F=0N, under nitrogen, 25° C., Shear rate 0.3-40 s$^{-1}$ (data points: starting from 0.3 in increments of 0.3-0.4 to 40). For extrapolation Casson's model was used.

The plastic viscosity preferably ranges between 1 and 30.

The desired rheological properties of the compositions can be controlled via the amounts of components, as defined above, in particular the type and amounts of fillers used.

The compositions of the invention can be used as 3D printing materials.

The compositions of the invention can further be used in methods for manufacturing a three-dimensional part by additive manufacturing (3D printing), the method comprising:
a) printing a reactive curable printable composition according to the invention in a layer-by-layer manner to form the three-dimensional part; and
b) curing the printed layers of the reactive curable printable composition to obtain the three-dimensional part.

The method may comprise printing a first layer of the material and then printing subsequent layers on top of the already printed layers to form a 3D object. Curing can occur once the material has been printed, for example directly after the material leaves the printing device or once the complete form has been printed. Curing is typically a two-step procedure, where the first curing step includes exposure to radiation, in particular UV radiation. This leads to crosslinking of the (meth)acrylate groups, i.e. the terminal groups of formula (I). In a second curing step, the curing is typically achieved by exposure to (atmospheric) moisture. This leads to the crosslinking of the silane groups, i.e. the terminal groups of formula (II). The combination of these two curing mechanisms in a dual curing composition of the present invention, provides the printable compositions and the objects formed therefrom with a number of advantageous properties, as described above.

The printing is typically achieved by extrusion, for example through a nozzle or orifice of a printhead in form of a filament or strand. The paste may be transported to the printhead by any suitable means, such as a screw-conveyor or other means known to those skilled in the art. Due to the shear forces that act on the composition during transport and extrusion/printing, the viscosity is lowered to such a degree that the composition is printable with the selected device but increases once the layer has been formed such that the formed object retains its form even before curing is completed. The printing/extrusion may include heating the composition and/or the printhead. Typical composition temperatures for printing/extrusion range from about 10° C. to about 120° C., typically from about 20 to about 100° C. In some embodiments, temperatures in the range of 20 to 40 or 55 to 85° C. may be preferred.

The composition in paste form may be used directly in a 3D printer. For this purpose, the composition may be provided in a cartridge.

In principle, in the present invention, all features mentioned in the context of the present text, in particular the embodiments, ranges of proportions, components and other features of the composition according to the invention and of the uses according to the invention shown as preferred and/or special can be implemented in all possible and not mutually exclusive combinations, with combinations of features shown as preferred and/or special also being regarded as preferred and/or special. All embodiments disclosed for the compositions per se can similarly be applied to the uses and methods described herein and vice versa.

EXAMPLES

Example 1: (Meth)Acrylate-Terminated Polymers

TABLE 1

(all amounts in wt.-%)

|  | Polymer 1 | Polymer 2 | Polymer 3 |
|---|---|---|---|
| PPG 2000 | 73.98 |  |  |
| PPG 8000 |  | 92.07 |  |
| PPG 12000 |  |  | 94.47 |
| IPDI | 16.38 | 5.08 | 3.47 |
| Hydroxy Ethyl Methacrylate | 9.57 | 2.78 | 1.98 |
| DOTL | 0.07 | 0.07 | 0.08 |
| Total | 100 | 100 | 100 |

DOTL: Dioctyl tin dilaurate

In a first step, the polyol (PPG), the isocyanate (IPDI) and the catalyst (DOTL) were mixed for 2.5 hours at 80° C. under nitrogen at 400 U/minute. The molar ratio of OH groups to NCO groups was 1:1. After the reaction, the reaction mixtures were allowed to cool to 25° C. and then the acrylate was added (in an amount that corresponds to a molar ratio of OH (polyol):NCO:OH (acrylate) of 1:1:1. Mixing was carried out for 3 hours at 25° C. The obtained Polymers 1 to 3 were clear or slightly cloudy (Polymer 2) liquids.

Example 2: Formulations

The Polymers 1 to 3 of Table 1 were used in various formulations. All amounts given are in wt.-% relative to the total weight of the composition. All formulations were tack-free after curing (with UV light). The measurement of hardness was carried out using a durometer in accordance with DIN EN ISO 868:2003. Measurements of mechanical properties (tensile test) were determined in accordance with DIN 53504:2017.

TABLE 2

(all amounts in wt.-%)

|  | Formulation 1 | Formulation 2 | Formulation 3 |
|---|---|---|---|
| Polymer 1 | 99 |  |  |
| Polymer 2 |  | 99 |  |
| Polymer 3 |  |  | 99 |
| Omnirad TPO-L (photoinitiator) | 0.9 | 0.9 | 0.9 |
| DOTL | 0.1 | 0.1 | 0.1 |
| Total | 100 | 100 | 100 |
| Hardness (shore A) | 74 | 55 | 48 |
| % | N/mm² | N/mm² | N/mm² |
| 10 | 0.95 | 0.21 | 0.13 |
| 25 | 1.91 | 0.41 | 0.22 |
| 50 |  | 0.64 | 0.33 |
| 100 |  | 1.02 | 0.46 |
| 200 |  |  | 0.81 |
| 41 | 2.71 |  |  |
| 121 |  | 1.18 |  |
| 205 |  |  | 0.83 |

Example 3: 3D Printing Formulation Based on (Meth)Acrylate-Terminated Polymer

TABLE 3

(all amounts in wt.-%)

| Component/Formulation | Formulation 4 |
|---|---|
| Polymer 1 | 46.5 |
| Voranol 2000 PPG | 14.8 |
| Omnirad TPO-L (photoinitiator) | 1 |
| Tinuvin 328 (light stabilizer) | 0.5 |
| Viscoexcel 30 SG (fatty acid modified chalk filler) | 37.2 |
| Total | 100 |
| Tensile strength | 3.64 N/mm² |
| Shore A | 62 |
| Printability | yes |
| Yield stress | 692 |

Example 4: Preparation of Methacrylate- and Silane-Terminated Polymer

In a first step, 72.8 wt.-% of polypropylene oxide (PPG 2000), 16.2 wt.-% of isophorone diisocyanate (IPDI) and 0.07 wt.-% of dioctyl tin dilaurate (DOTL) were mixed for 0.5 hours at 80° C. under nitrogen at 400 U/minute. The molar ratio of OH groups to NCO groups was 1:2. After the reaction, the reaction mixture was allowed to cool to 25° C. and then 6.5 wt.-% of aminopropyl trimethoxysilane (AMMO) was added, and 0.5 hours later 4.5 wt.-% of hydroxy ethyl methacrylate (HEMA) was added (in an amount that corresponds to a molar ratio of OH(from polyol):NCO:NH₂(from AMMO):OH(acrylate from HEMA) of 1:2:0.5:0.48. Mixing was carried out for 4.5 hours at 25° C. The mixture of methacrylate-terminated polymer, silane-terminated polymer, and methacrylate- and silane-terminated polymer was obtained. The obtained methacrylate- and silane-terminated polymer was clear liquid with a molecular weight MW of 7400 g/mol (determined by gel permeation chromatography (GPC) with tetrahydrofuran (THF) as the eluent according to DIN 55672-1:2007-

08) and a viscosity of 68000mPa·s (Anton Paar, Physica MCR 301 at 23° C., Spindle PP25).

What is claimed is:

1. A reactive curable printable composition, comprising:
   (i) at least one polymer A comprising at least one terminal group of formula (I):

-A¹-C(=O)—CR¹=CH₂ (I), wherein:
   A¹ comprises a substituted or unsubstituted amide, carbamate, urethane, urea, imino, siloxane, carboxylate, carbamoyl, amidino, carbonate, sulfonate or sulfinate group;
   R¹ is selected from H and $C_1$-$C_4$ alkyl;
   wherein the polymer backbone of the at least one polymer A is a polyoxyalkylene; and
   (ii) at least one filler that is configured to modify one or more rheological properties of the composition,
   wherein the composition is in a form of a paste and has a yield stress of greater than 25, wherein the yield stress is calculated using the formula:

$$\tau^{\frac{1}{2}} = k_{oc}^{\frac{1}{2}} + k_c^{\frac{1}{2}} \gamma^{\frac{1}{2}},$$

wherein τ (tau) is shear stress, $k_{oc}$ is Casson yield stress, $k_c$ is Casson plastic viscosity and γ (gamma) is shear rate, wherein the shear rate and the shear stress are measured using BS EN ISO 3219:1995, wherein the measuring conditions are as follows: Geometry: 25 mm plate/plate geometry, Gap: 0.25 mm, F=0N, under nitrogen, 25° C., Shear rate 0.3-40 s⁻¹, wherein Casson's model is used for extrapolation.

2. The reactive curable printable composition of claim 1, wherein A¹ is a group of formula (III):

—R¹¹-A¹¹-(R¹²-A¹²)ₙ-R¹³- (III)

wherein:
   R¹¹, R¹², and R¹³ are independently a bond or a divalent substituted or unsubstituted hydrocarbon residue with 1 to 20 carbon atoms;
   A¹¹ and A¹² are each independently a divalent group selected from —O—C(=O)—NH—, —NH—C(=O)—O—, —NH—C(=O)—NH—, —NR"—C(=O)—NH—, —NH—C(=O)—NR"—, —NH—C(=O)—, —C(=O)—NH—, —C(=O)—O—, —O—C(=O)—, —O—C(=O)—O—, —S—C(=O)—NH—, —NH—C(=O)—S—, -A C(=O)—S—, —S—C(=O)—, —S—C(=O)—S—, —C(=O)—, —S—, and —NR"—, wherein R" can be hydrogen or a hydrocarbon moiety with 1 to 12 carbon atoms; and
   n is 0 or 1.

3. The reactive curable printable composition of claim 2, wherein:
   R¹¹ is a bond or a divalent substituted or unsubstituted hydrocarbon residue with 1 to 20 carbon atoms;
   A¹¹ is a divalent group selected from —O—C(=O)—NH—, —NH—C(=O)—NH—, and —NR"—C(=O)—NH—;
   R¹³ is a bond or a divalent substituted or unsubstituted hydrocarbon residue with 1 to 20 carbon atoms;
   n is 0 or 1, provided that if n is 1,
   R¹² is a divalent substituted or unsubstituted hydrocarbon residue with 1 to 20 carbon atoms; and
   A¹² is a divalent group selected from —NH—C(=O)—O—, —NH—C(=O)—NH—, and —NH—C(=O)—NR"—.

4. The reactive curable printable composition of claim 2, wherein R¹¹ and R¹³ are selected from a bond, methylene, ethylene, or n-propylene group.

5. The reactive curable printable composition of claim 1, wherein the composition further comprises:
   (i) at least one photoinitiator;
   (ii) at least one catalyst; or
   (iii) a combination thereof.

6. The reactive curable printable composition of claim 5, wherein the composition comprises, relative to the total weight of the composition:
   (i) 0.01 to 90 wt.-% of the at least one polymer A;
   (ii) 0.01 to 5 wt.-% of the at least one photoinitiator;
   (iii) 0.01 to 60 wt.-% of the at least one filler;
   (iv) 0.01 to 5.0 wt.-% of the at least one catalyst; or
   (v) a combination thereof.

7. The reactive curable printable composition of claim 1, further comprising at least one reactive diluent and/or at least one liquid filler.

8. The reactive curable printable composition of claim 1, wherein the at least one polymer A further comprises at least one terminal group of formula (II):

-A²-SiXYZ (II), wherein X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups, and
   A² comprises a substituted or unsubstituted ether, amide, carbamate, urethane, urea, imino, siloxane, carboxylate, carbamoyl, amidino, carbonate, sulfonate or sulfinate group.

9. The reactive curable printable composition of claim 8, wherein the at least one polymer A:
   (i) comprises at least two terminal groups of the formula (I) or comprises at least one terminal group of the formula (I) and at least one terminal group of the formula (II);
   (ii) comprises 1 to 100 mol-% of terminal groups of the formula (I) and 99 to 0 mol-% of terminal groups of the formula (II);
   (iii) comprises: (i) two or three terminal groups of the formula (I); or (ii) one terminal group of the formula (I) and one or two terminal groups of the formula (II); or (iii) two terminal groups of the formula (I) and one terminal group of the formula (II);
   (iv) is a linear polymer; or
   (v) any combination thereof.

10. The reactive curable printable composition of claim 1, further comprising:
    at least one polymer B comprising at least one terminal group of formula (II):

-A²-SiXYZ (II), wherein X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups;

$A^2$ comprises a substituted or unsubstituted ether, amide, carbamate, urethane, urea, imino, siloxane, carboxylate, carbamoyl, amidino, carbonate, sulfonate or sulfinate group; and wherein the polymer backbone of the at least one polymer B is selected from the group consisting of polyoxyalkylenes, poly(meth)acrylates, polyesters, and combinations thereof.

11. The reactive curable printable composition of claim 1, wherein the at least one polymer A further comprises at least one terminal group of formula (II), and/or said composition further comprises at least one polymer B;

wherein the at least one polymer B comprises the at least one terminal group of the formula (II), wherein the least one terminal group of the formula (II) is:

    (II), wherein X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups; and $A^2$ comprises a substituted or unsubstituted ether, amide, carbamate, urethane, urea, imino, siloxane, carboxylate, carbamoyl, amidino, carbonate, sulfonate or sulfinate group; and wherein the polymer backbone of the at least one polymer B is selected from the group consisting of polyoxyalkylenes, poly(meth)acrylates, polyesters, and combinations thereof.

12. The reactive curable printable composition of claim 1, wherein the at least one polymer A, the at least one polymer B, or the combination thereof, has a polyoxypropylene backbone.

13. The reactive curable printable composition of claim 11, wherein $A^2$ is a group of formula (IV):

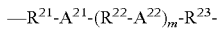    (IV)

wherein:

$R^{21}$, $R^{22}$, and $R^{23}$ are independently a bond or a divalent substituted or unsubstituted hydrocarbon residue with 1 to 20 carbon atoms;

$A^{21}$ and $A^{22}$ are each independently a divalent group selected from —O—C(=O)—NH, —NH—C(=O)O—, —NH—C(=O)—NH—, —NR"—C(=O)—NH—, —NH—C(=O)—NR"—, —NH—C(=O)—, —(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR"—, wherein R" can be hydrogen or a hydrocarbon moiety with 1 to 12 carbon atoms; and m is 0 or 1.

14. The reactive curable printable composition of claim 13, wherein:

$R^{21}$ is a bond or a divalent substituted or unsubstituted hydrocarbon residue with 1 to 20 carbon atoms;

$R^{23}$ is a bond or a divalent substituted or unsubstituted hydrocarbon residue with 1 to 20 carbon atoms;

m is 0 or 1, provided that if m is 0, $A^{21}$ is a divalent group selected from —O—, —O—C(=O)—NH—, —NH—C(=O)—NH—, and —NR"—C(=O)—NH—; and provided that if m is 1, $A^{21}$ is a divalent group selected from —O—, —O—C(=O)—NH—, —NH—C(=O)—NH—, and —NR"—C(=O)—NH—;

$R^{22}$ is a divalent substituted or unsubstituted hydrocarbon residue with 1 to 20 carbon atoms; and $A^{22}$ is a divalent group selected from —NH—C(=O)O—, —NH—C(=O)—NH—, and —NH—C(=O)—NR"—.

15. The reactive curable printable composition of claim 13, wherein $R^{21}$ and $R^{23}$ are selected from a bond, methylene, ethylene, or n-propylene group.

16. The reactive curable printable composition of claim 11, wherein

X, Y, and Z are, independently of one another, selected from a hydroxyl, a methyl, an ethyl, a methoxy, or an ethoxy group, wherein at least one of the substituents is a hydroxyl group, or a methoxy or an ethoxy group.

17. The reactive curable printable composition of claim 1, wherein the at least one filler comprises fatty acid modified chalk.

* * * * *